(12) United States Patent
Miyazawa et al.

(10) Patent No.: US 7,410,263 B2
(45) Date of Patent: *Aug. 12, 2008

(54) REAR PROJECTION TYPE MULTI-PROJECTION DISPLAY

(75) Inventors: Yasunaga Miyazawa, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 10/975,099

(22) Filed: Oct. 28, 2004

(65) Prior Publication Data

US 2005/0146644 A1    Jul. 7, 2005

(30) Foreign Application Priority Data

Nov. 6, 2003   (JP)   .............................. 2003-377177

(51) Int. Cl.
    *G03B 21/14*   (2006.01)
(52) U.S. Cl. ............................. 353/94; 353/69; 353/101
(58) Field of Classification Search .................... 353/94, 353/69, 70; 348/745, 840, 750; 352/70, 352/133, 13
    See application file for complete search history.

(56) References Cited

U.S. PATENT DOCUMENTS

| | | | | |
|---|---|---|---|---|
| 5,589,985 | A | * | 12/1996 | Heller et al. ................. 359/608 |
| 5,847,784 | A | | 12/1998 | Finnila et al. |
| 5,956,000 | A | | 9/1999 | Kreitman et al. |
| 6,050,690 | A | * | 4/2000 | Shaffer et al. ................ 353/122 |
| 6,695,451 | B1 | | 2/2004 | Yamasaki et al. |
| 2001/0026247 | A1 | * | 10/2001 | Nishio et al. .................... 345/4 |
| 2002/0024640 | A1 | * | 2/2002 | Ioka ............................ 353/94 |
| 2003/0214633 | A1 | * | 11/2003 | Roddy et al. .................. 353/31 |
| 2004/0125344 | A1 | * | 7/2004 | Matsui ......................... 353/94 |
| 2004/0184011 | A1 | * | 9/2004 | Raskar et al. .................. 353/94 |
| 2005/0088629 | A1 | * | 4/2005 | Greenberg et al. ............. 353/94 |
| 2005/0117126 | A1 | | 6/2005 | Miyazawa et al. |

FOREIGN PATENT DOCUMENTS

| | | |
|---|---|---|
| JP | 06-123868 | 5/1994 |
| JP | A-06-178327 | 6/1994 |
| JP | A-08-082854 | 3/1996 |
| JP | A-08-094974 | 4/1996 |
| JP | 09-200662 | 7/1997 |
| JP | A-09-211386 | 8/1997 |
| JP | A-09-326981 | 12/1997 |
| JP | 2000-350230 | 12/2000 |
| JP | 2001-147667 | 5/2001 |

(Continued)

*Primary Examiner*—William C. Dowling
(74) *Attorney, Agent, or Firm*—Oliff & Berridge, PLC

(57) ABSTRACT

Exemplary embodiments of the invention provide a circuit that includes a plurality of projector units to modulate and project light from a light source based on image information, a transmissive screen to which projection images from the plurality of projector units are projected, an image-capturing device disposed in a housing to capture predetermined regions of the projection images projected onto the transmissive screen, a unit image information generating unit to generate image information to be inputted to each of the plurality of projector units, and a unit image information correcting unit to correct the unit image information based on a result captured by the image-capturing device. Therefore, it is possible to perform easily the adjustment process and to further reduce the adjustment time.

20 Claims, 30 Drawing Sheets

| | FOREIGN PATENT DOCUMENTS | | | WO | WO 99/14716 | 3/1999 |
|---|---|---|---|---|---|---|
| | | | | WO | WO-A1-99/31877 | 6/1999 |
| JP | 2001-166377 | 6/2001 | | WO | WO 00/18139 | 3/2000 |
| JP | A-2001-251651 | 9/2001 | | | | |
| JP | A-2001-339672 | 12/2001 | | * cited by examiner | | |

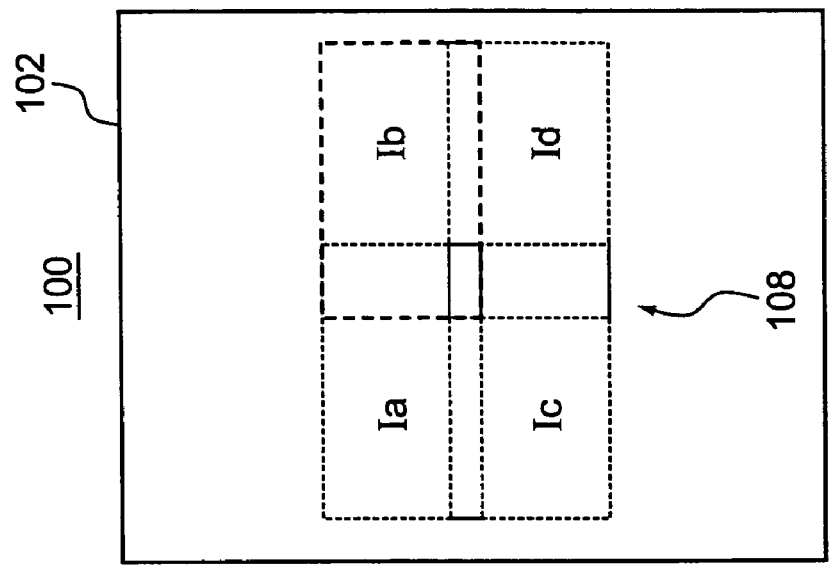
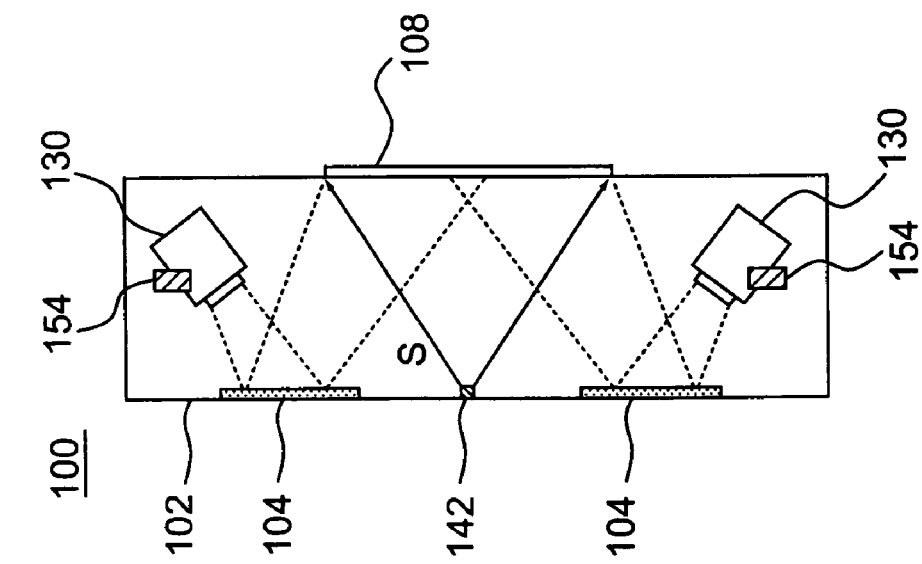

FIG. 7
(BEFORE CORRECTING)  (AFTER CORRECTING)
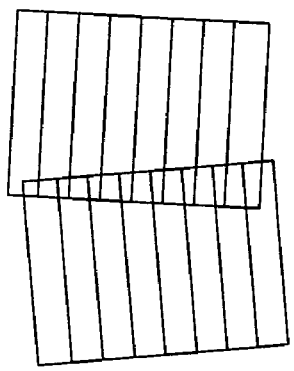 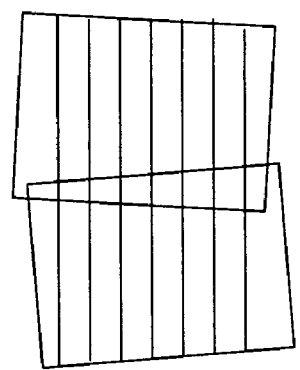
(BEFORE CORRECTING)  (AFTER CORRECTING)
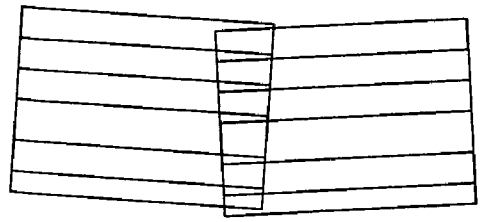 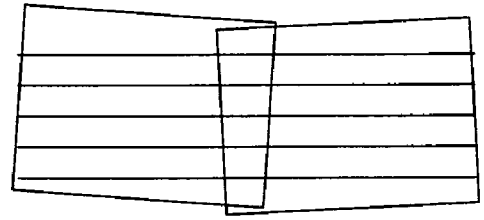

FIG. 8
(BEFORE CORRECTING)　　　(AFTER CORRECTING)
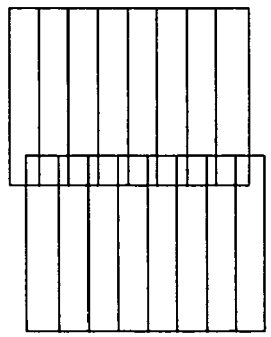 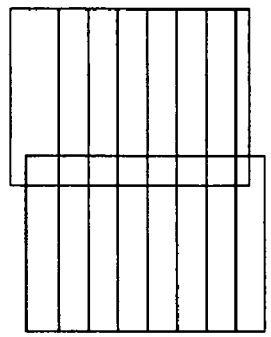
(BEFORE CORRECTING)　　　(AFTER CORRECTING)
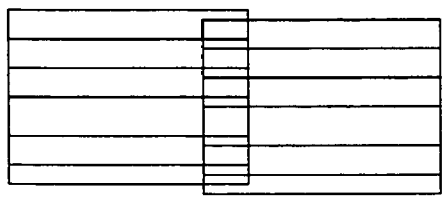 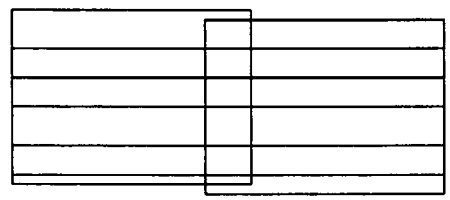

FIG. 12A
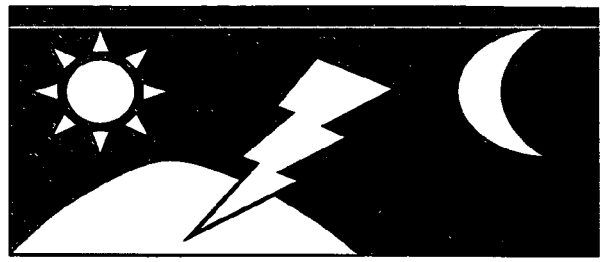
(ORIGINAL IMAGE)
FIG. 12B
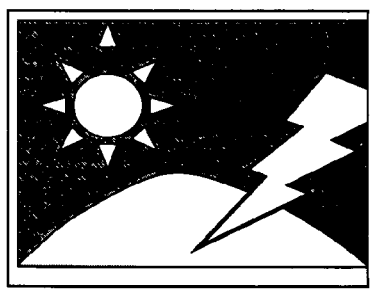    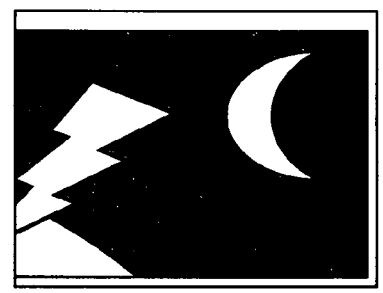
(ALLOCATION OF IMAGE TO PJU$_a$)    (ALLOCATION OF IMAGE TO PJU$_b$)
FIG. 12C
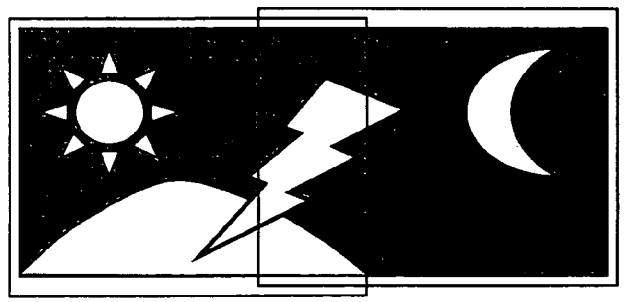
(IMAGE PROJECTED BY TWO PROJECTOR UNITS PJU$_a$ AND PJU$_b$)

FIG. 17A (TRAPEZOIDAL DISTORTION)
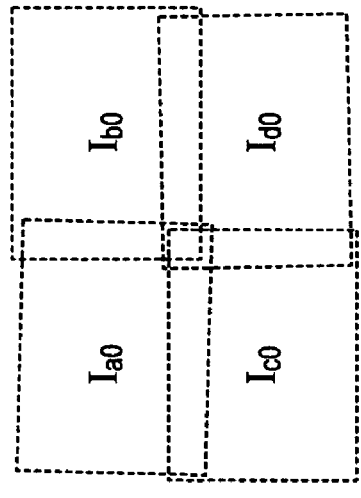
(i)
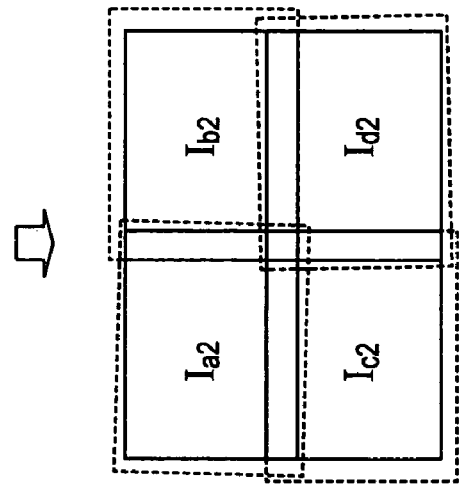
(ii)
FIG. 17B (NO TRAPEZOIDAL DISTORTION)
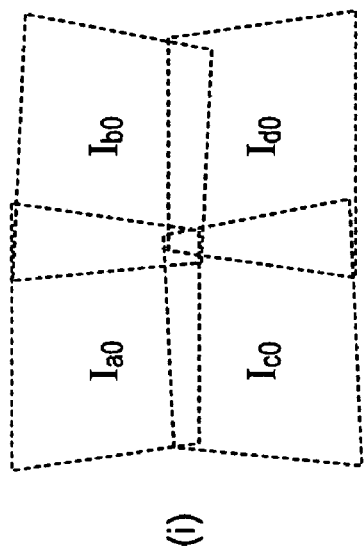
(i)
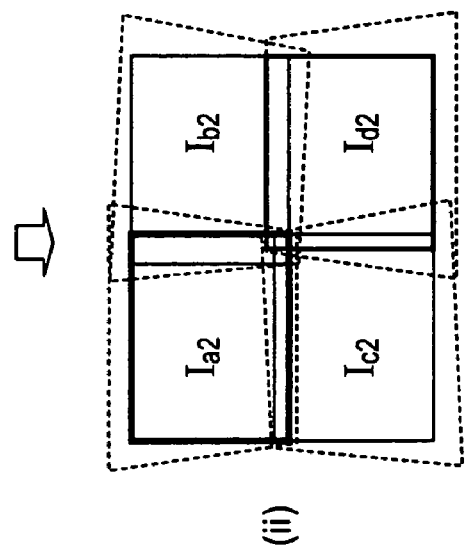
(ii)

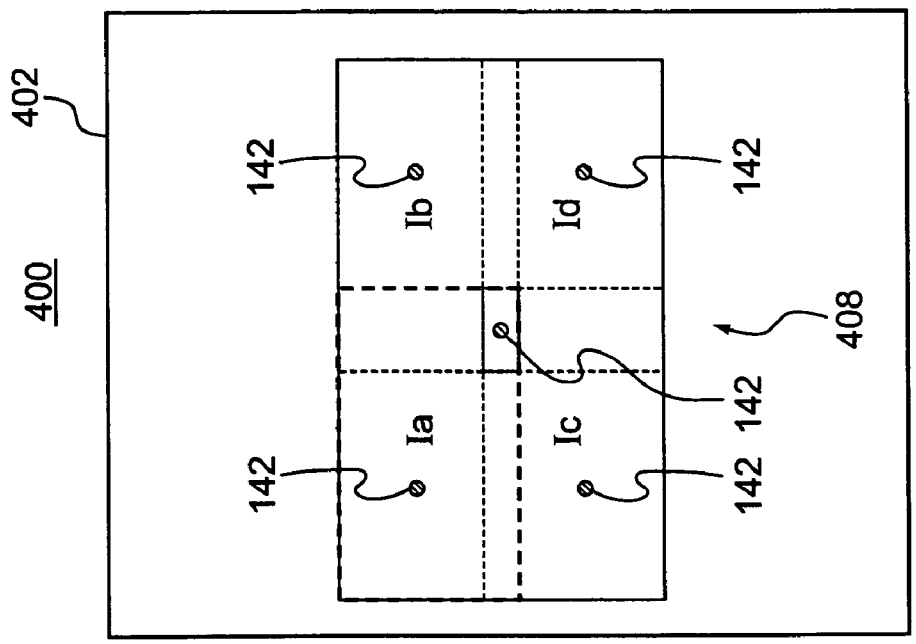

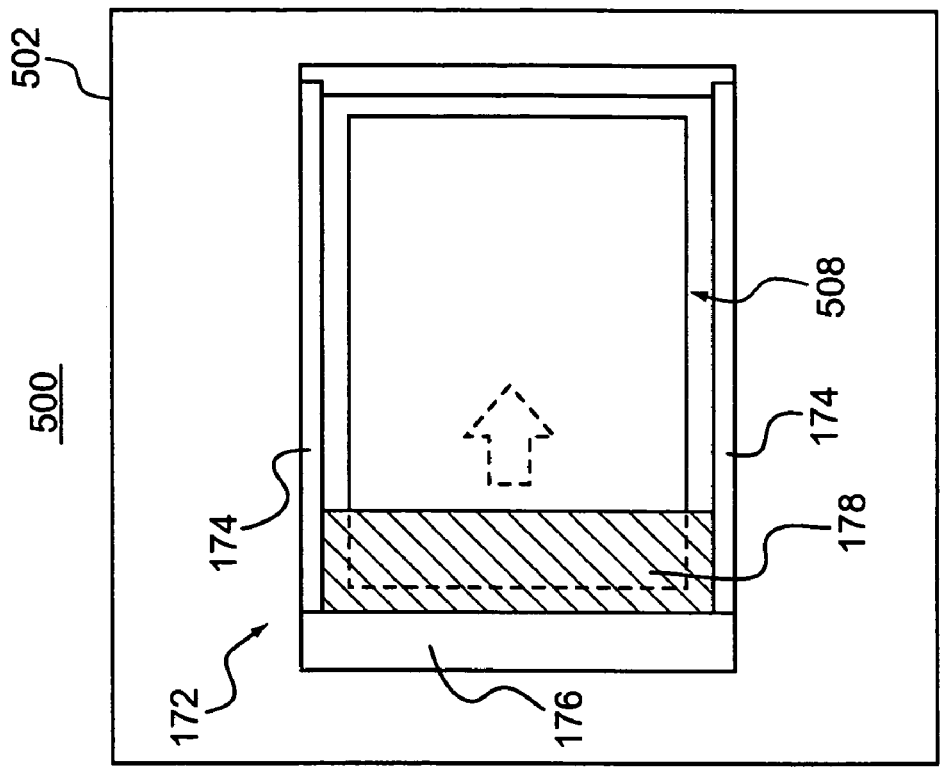
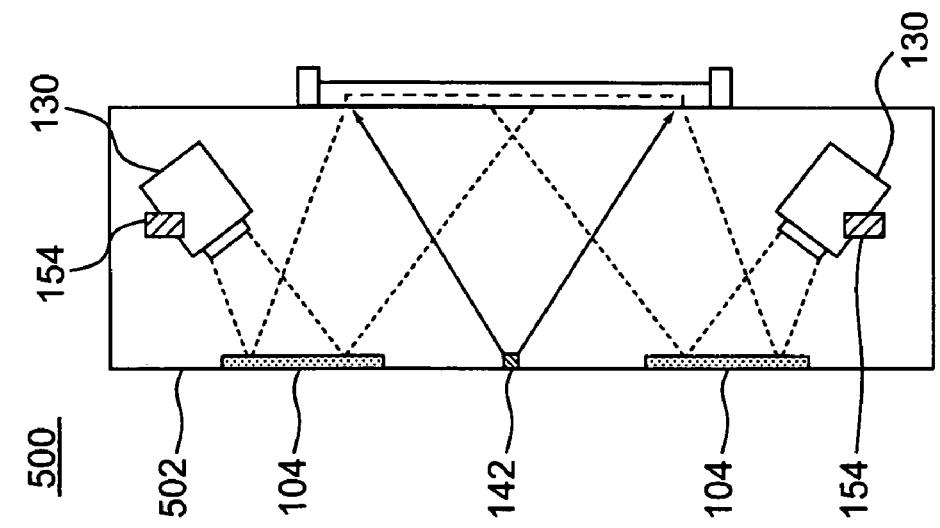
FIG. 20B
FIG. 20A

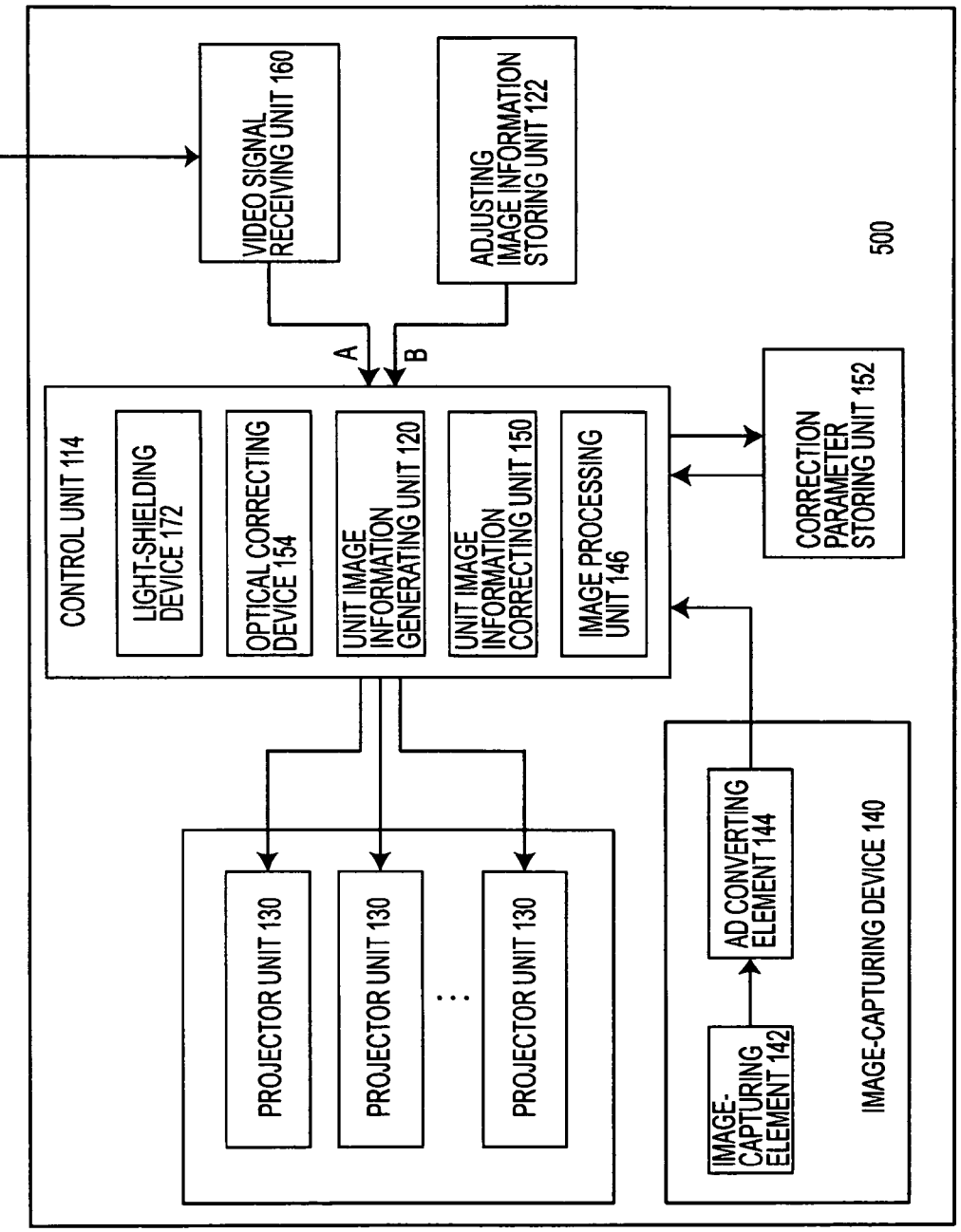

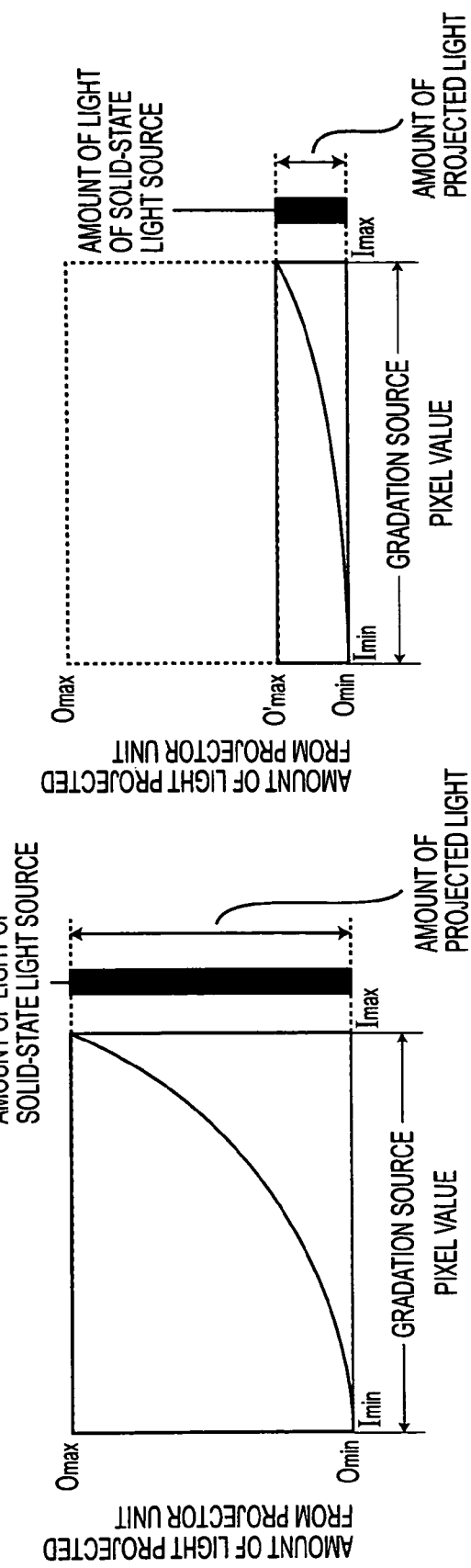

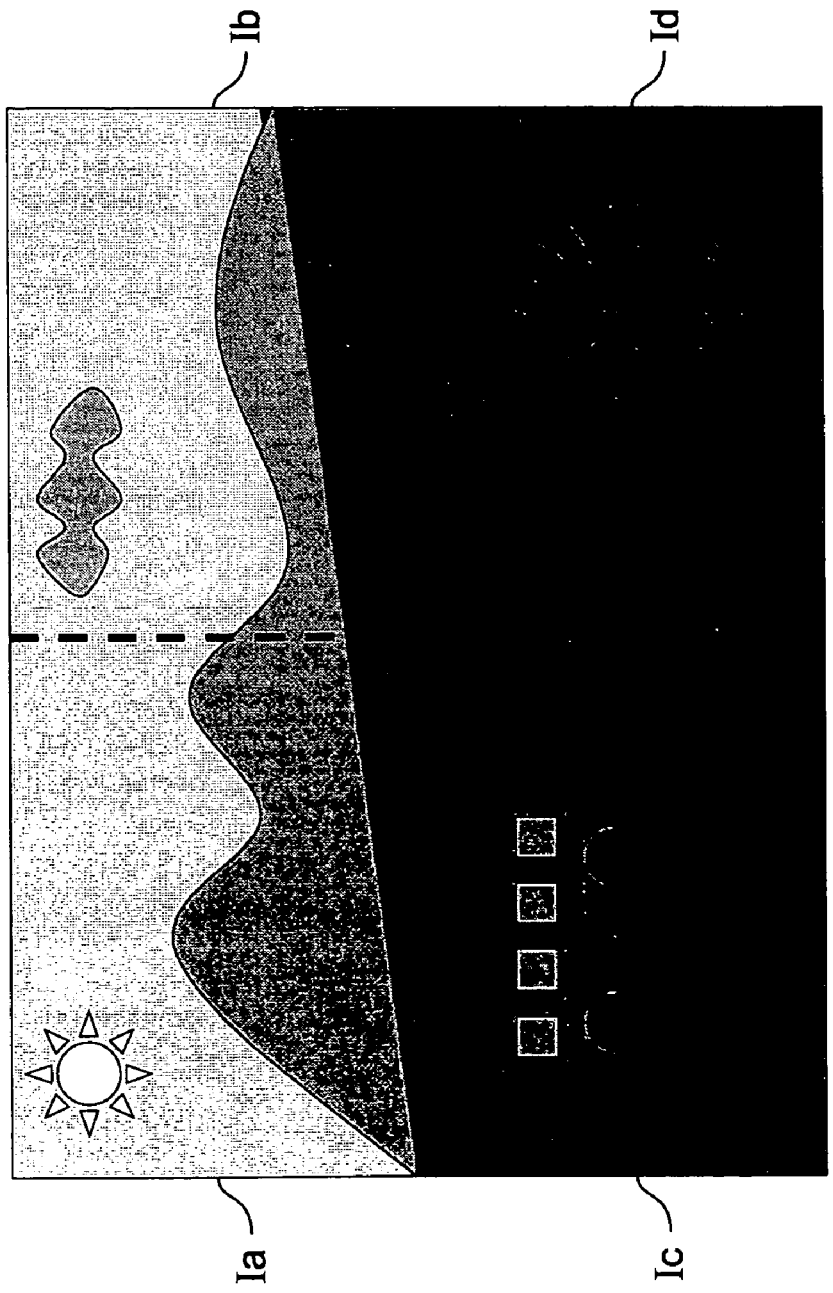

REAR PROJECTION TYPE MULTI-PROJECTION DISPLAY

BACKGROUND OF THE INVENTION

1. Field of Invention

The present invention relates to a rear projection type multi-projection display.

2. Description of Related Art

Related art documents Japanese Unexamined Patent Application Publication No. 8-82854, Japanese Unexamined Patent Application Publication No. 8-94974, Japanese Unexamined Patent Application Publication No. 2001-339672, International Publication Pamphlet No. 99/31877, Japanese Unexamined Patent Application Publication No. 9-326981, Unexamined Patent Application Publication No. 2001-251651, Japanese Unexamined Patent Application Publication No. 6-178327, Japanese Unexamined Patent Application Publication No. 9-211386, U.S. Pat. No. 5,956,000, disclose a rear projection type multi-projection display in which a plurality of projector units (projection optical unit) are arranged in a horizontal direction and in a vertical direction and projection images from the plurality of projector units are projected onto a screen in a magnified scale to display one large screen image. Such a multi-projection display can display images with high definition and high brightness, as compared to other related art projectors. Thus, it is expected that the multi-projection display will have wide commercial applications in future in business fields, such as cinemas, art galleries, museums, seminar halls, assembly halls, mini-theaters, public institutes, and companies or for domestic uses, such as an amusement and a home theater.

But, in such a multi-projection display, if the projection images from the respective projector units are not connected smoothly to each other, it is impossible to match the projection images from the respective projector units to each other. Further, a boundary is remarkable, and then image quality is lowered.

For this reason, in the multi-projection display disclosed in related art documents Japanese Unexamined Patent Application Publication No. 8-82854, Japanese Unexamined Patent Application Publication No. 8-94974, in order to address and/or solve the above discussed and/or other problems, the projection images from the respective projector units are made not to overlap each other and the joint portions thereof become small.

However, in such a multi-projection display, there is a problem in that at the time of setting up, it is not easy to remove joint portions of the projection images from the respective projector units or connect the projection images without inconsistency.

For this reason, in the multi-projection display disclosed in related art documents Japanese Unexamined Patent Application Publication No. 2001-339672, International Publication Pamphlet No. 99/31877, Japanese Unexamined Patent Application Publication No. 9-326981, Unexamined Patent Application Publication No. 2001-251651, Japanese Unexamined Patent Application Publication No. 6-178327, Japanese Unexamined Patent Application Publication No. 9-211386, U.S. Pat. No. 5,956,000, in order to address and/or solve the above discussed and/or other problems, the projection images from adjacent projector units are made to overlap partially on the screen such that the projection images are smoothly connected to each other in the overlapped region.

However, in such a multi-projection display, if how the projection images from the respective projector units are displayed on the screen are not known accurately, it is impossible to connect smoothly the projection images on the screen. Thus, in the multi-projection display disclosed in related art documents Japanese Unexamined Patent Application Publication No. 2001-339672, International Publication Pamphlet No. 99/31877, Japanese Unexamined Patent Application Publication No. 9-326981, Unexamined Patent Application Publication No. 2001-251651, an image-capturing device such as a monitoring camera or a digital camera is provided at a viewer's side and the projection images (adjusting images) from the respective projector units which are displayed on the screen are captured, such that how the projection images are displayed on the screen can be accurately measured.

SUMMARY OF THE INVENTION

However, in the multi-projection display disclosed in related art documents Japanese Unexamined Patent Application Publication No. 2001-339672, International Publication Pamphlet No. 99/31877, Japanese Unexamined Patent Application Publication No. 9-326981, Unexamined Patent Application Publication No. 2001-251651, since the image-capturing device is provided at the viewer's side to capture the adjusting images, after finishing the adjustment, it is followed by rearranging the image-capturing device (the image-picturing device is removed). Therefore, if the viewer wants to adjust the images again, it needs to provide the image-capturing device. In this regard, the image-capturing device has to be disposed in a precise position with respect to the multi-projection display. Thus, there are problems in that since the installation of the image-capturing device is performed by a general user, the adjustment operation becomes complicated and it takes much time to perform the adjustment operation.

Accordingly, exemplary embodiments of the present invention are made to address and/or solve the above discussed and/or other problems, and it is an object of exemplary embodiments of the present invention to provide a multi-projection display which can further shorten the adjustment time and easily perform the adjustment.

The present inventors have earnestly studied to attain the above objects and then discovered that the above objects can be attained by providing an image-capturing device in a housing of a rear projection type multi-projection display to shorten the adjustment time and perform easily the adjustment operation, thereby completing exemplary embodiments of the present invention.

(1) A rear projection type multi-projection display of exemplary embodiments of the present invention includes a plurality of projector units to modulate and project light from a light source based on image information, a transmissive screen to which projection images from the plurality of projector units are projected, an image-capturing device disposed in a housing to capture predetermined regions of the projection images projected onto the transmissive screen, a unit image information generating unit to generate image information (hereinafter, referred to as 'unit image information') to be inputted to each of the plurality of projector units, and a unit image information correcting unit to correct the unit image information based on a result captured by the image-capturing device.

Accordingly, according to the rear projection type multi-projection display of exemplary embodiments of the present invention, the image-capturing device is provided in the housing of the rear projection type multi-projection display to capture the projection image from the rear surface thereof. Therefore, if the image-capturing device is provided in the housing of the rear projection type multi-projection display in an appropriate position, there is no need to rearrange the image-capturing device after image-capturing process, such as in the related art. As a result, the adjustment operation is easily performed in a reduced time.

In addition, according to the rear projection type multi-projection display of exemplary embodiments of the present invention, since the image-capturing device is provided in the housing of the rear projection type multi-projection display, it is easy to provide the image-capturing device in a precise position with respect to the transmissive screen. Therefore, it is possible to capture the adjusting images more accurately and easily, compared to the related art.

Further, according to the rear projection type multi-projection display of exemplary embodiments of the present invention, since the image-capturing device is provided in the housing of the rear projection type multi-projection display, it is easy to put the control circuit for processing a result captured by the image-capturing device in the housing and as a result, it is easy to move and install the rear projection type multi-projection display.

Therefore, the rear projection type multi-projection display having a small size can be used commercially and in homes.

In addition, in the multi-projection display, in order to capture the projection image more accurately, the image is captured after removing the influence of the external light. Therefore, the multi-projection display disclosed in related art document Japanese Unexamined Patent Application Publication No. 2001-251651 removes the influence of the external light in such a manner that a large light-shielding device (FIGS. 4 to 9) formed in a quadrangular pyramid or roll-shaped or a U-shaped light-shielding device (FIG. 12) which moves together with the image-capturing device is provided closely to the housing around the image-capturing device which is installed at the viewer's side. As a result, in the multi-projection display disclosed in related art Japanese Unexamined Patent Application Publication No. 2001-251651, it is necessary to provide the light-shielding device whenever the projection images are captured, and thus the adjustment operation becomes complicated and the adjustment time increase.

To the contrary, according to the rear projection type multi-projection display of exemplary embodiments of the present invention, since the image-capturing device is arranged in the housing of the rear projection type multi-projection display, the intensity of external light incident to the image-capturing device can be decreased. Therefore, it is possible to precisely capture the adjusting image, compared to the related art, without providing a light-shielding device for shielding the external light. As a result, there is no need to provide the light-shielding device every time the projection images are captured as in the related art, and the adjustment operation is easily performed in a reduced time.

(2) The rear projection type multi-projection display according to the above (1) further includes a light-shielding device for shielding external light incident on the housing via the transmissive screen when capturing an image by using the image-capturing device.

As mentioned above, in the rear projection type multi-projection display according to exemplary embodiments of the present invention, the intensity of the external light incident to the image-capturing device can be decreased without providing the light-shielding device. However, by providing the light-shielding device for shielding the external light incident on the housing via the transmissive screen, the intensity of the external light incident to the image-capturing device can be decreased and the projection image can be captured more accurately.

An opening and closing light-shielding curtain or door may be used as the light-shielding device. The opening and closing light-shielding curtain or door is provided outside the transmissive screen to be opened at ordinary times and to be closed when capturing the projection images.

An electrochromic glass or liquid crystal shutter having variable transmittance provided outside the transmissive screen may be used as the light-shielding device. In this regard, the transmittance is set to the maximum level at ordinary times, and to the minimum level when capturing the projection images.

As another example of light-shielding device, a material of the transmissive screen may be an electrochromic material. In this case, the transmittance is set to the maximum level at ordinary times, and to the minimum level when capturing the projection images.

In any of light-shielding devices, it is preferable to automatically shield the external light when performing the image-capturing process by the image-capturing device. Therefore, there is no need to perform the adjustment operation by a user, and thus the adjustment operation does not get complicated.

(3) The rear projection type multi-projection display according to the above (1) or (2), further includes an external light state evaluating unit to evaluate a state of external light by capturing the transmissive screen in a state when the light source does not emit or weakly emits, and the amount of light emitted from the light source may be controlled based on a result evaluated by the external light state evaluating unit.

According to the above structure, in the presence of a strong external light, the amount of light emitted from the LED light source is correspondingly increased to lessen the effect of the external light during the image capturing process.

(4) In the rear projection type multi-projection display according to the above (3), the external light state evaluating unit may have a function of evaluating the state of the external light by capturing the transmissive screen based on the amount of light which is emitted from the light source at at least two emitting levels.

Generally, since the effect of the external light on the image quality is non-linear, the state of the external light is evaluated by capturing the transmissive screen based on an amount of light which is emitted from the light source at at least two emitting levels to lessen the effect of the external light during the image-capturing process.

(5) In the rear projection type multi-projection display according to the above (3) or (4), the external light state evaluating unit further has a function of evaluating a state of stray light by capturing the transmissive screen in a state when the light source in at least one of the plurality of projector units does not emit or weakly emits.

According to the above structure, since the amount of light emitted from the light source can be controlled in response to the state of stray light, it is possible to lessen the effect of the external light or stray light during the image-capturing process. Moreover, it is possible to enhance and/or improve the color reproductivity in the rear projection type multi-projection display.

(6) In the rear projection type multi-projection display according to any one of the above (1) to (5), the image-capturing device can change a capturing range.

According to the above structure, it is possible to capture images with a wide capturing range and a high magnification and to capture efficiently the projection image in various capturing modes.

The capturing range is changed by varying the position or orientation of the image-capturing device or by varying the construction of an optical system such as lens in the image-capturing device.

The image-capturing device 140 further has a zoom-function and an auto-focus function. Therefore, since it is possible to change the capturing range S or the magnifications, the degree of freedom or flexibility of capturing is enhanced and/or improved. Further, since the focus is automatically adjusted, the convenience is greatly enhanced and/or improved.

(7) In the rear projection type multi-projection display according to any one of the above (1) to (6), the image-capturing device may have a plurality of image-capturing elements.

According to the above structure, since image-capturing element to be used can be selected by a capturing object, it is possible to reduce the capturing time. Accordingly, the adjustment time is also reduced, and the precision of capturing and adjustment can be enhanced and/or improved.

(8) In the rear projection type multi-projection display according to any one of (1) to (7), the image-capturing device can capture the entire transmissive screen.

According to the above structure, it is possible to enhance and/or improve the color balance and brightness balance in the entire screen In the rear projection type multi-projection display according to the above (1) to (8), the unit image information correcting unit preferably corrects the unit image information based on a result of capturing adjusting unit images projected by the projector units.

The unit image information correcting unit may perform the correction of the unit image information based on a result of capturing a normal image. However, by correcting the unit image information based on the result of capturing the adjusting unit image, it is possible to perform the more accurate correction rapidly.

As the adjusting unit image, various unit images suitable to perform the correction of the unit image information, such as a beta image of white or monochrome, a lattice shape of monochrome, may be used.

In this case, it may be constructed such that the adjusting image information is stored in advance in an adjusting image information storing unit and the unit image information generating unit generates the adjusting unit image using the adjusting image information at the time of the adjustment operation. In addition, the adjusting unit image information may be stored in advance in the adjusting image information storing unit and at the time of the adjustment operation, the adjusting unit image information may be used as it is.

Further, every when the adjustment operation is performed, the adjusting image information may be inputted in the adjusting image information storing unit (by means of a DVD or the like) and the unit image information generating unit may generate the adjusting unit image information using the adjusting image information. Further, even when the adjustment operation is performed, the adjusting unit image information may be inputted directly in the adjusting image information storing unit.

(9) In the rear projection type multi-projection display according to any one of the above (1) to (8), the unit image information correcting unit preferably corrects shapes, positions and/or inclinations of unit images to be projected by the projector units.

According to the above structure, the shapes, the positions and/or the inclinations of the projection images from the respective projector units become proper, and thus it is possible to highly match the projection images from the respective projector units.

(10) In the rear projection type multi-projection display according to any one of the above (1) to (9), the unit image information correcting unit preferably corrects the brightness and/or colors of unit images to be projected by the projector units.

According to the above structure, the brightness and/or colors of the projection images from the respective projector units becomes proper, and thus it is possible to highly match the projection images from the respective projector units.

(11) In the rear projection type multi-projection display according to any one of the inventions (1) to (10), the unit image information correcting unit preferably corrects the brightness and/or color for every pixel in the plurality of projector units.

According to the above structure, it is possible to further match the projection images from the respective projector units, and thus it is possible to project the images extremely true to original image information.

In this case, the unit image information correcting unit preferably has a function of correcting the unit image to the brightness and/or color for every pixel in the respective projector units by comparing all of the adjusting image, which is formed by a plurality of adjusting unit images projected by the plurality of projector units with an original adjusting image.

(12) In the rear projection type multi-projection display according to any one of the above (1) to (11), the unit image information correcting unit preferably corrects the unit image information using correction parameters that are determined based on the captured result.

According to the above structure, after the correction parameters are determined based on the captured result, it is possible to easily correct the unit image information using the correction parameters.

(13) In the rear projection type multi-projection display according to the above (12), the display preferably further includes a correction parameter storing unit to store the correction parameters.

According to the above structure, it is possible to make the required storage capacity smaller than when storing the captured result itself. Further, it is possible to make the calculation quantities small when correcting the unit image information.

(14) In the rear projection type multi-projection display according to the above (12) or (13), the display preferably further includes an automatic correction parameter acquiring device to capture an adjusting image in certain circumstances to automatically acquire the correction parameters.

According to the above structure, for example, when the correction parameters needs to be re-determined (re-acquired) (for example, when three months have lapsed after re-acquiring), the automatic correction parameter acquiring device may operate automatically to acquire the correction parameters again. Further, when the regular time comes every day (for example, at 4 a.m.), the automatic correction parameter acquiring device may operate automatically to acquire the correction parameters again. Thus, without troubling the user's hand, it is possible to maintain smooth image quality, and further convenience is enhanced and/or improved.

Further, even though the characteristics of the light source or the electro-optical modulating device are changed by variation per hour, the correction parameters corresponding to the change in characteristic can be automatically acquired.

Thus, it is possible to constantly suppress deterioration of image quality due to the variation per hour.

(15) In the rear projection type multi-projection display according to any one of the exemplary embodiments of (1) to (14), the display preferably further includes an optical correcting device to correct the position and/or orientation of an optical element provided in the rear projection type multi-projection display.

According to the above structure, after the position and/or orientation of the optical element is corrected, smooth image quality is acquired. Since the correction is optically performed, there is no deterioration of image quality due to the adjustment operation.

The optical element includes the projector unit itself, a projection lens of the projector unit, and a reflector that reflects projection light from the projector unit to the transmissive screen.

In this case, after the position and/or orientation of the optical element is optically corrected, the capturing operation is performed again by using the image-capturing device, and then the correction parameters are determined based on the captured result.

According to the above operation, after rough correction is optically performed, detail correction is electronically performed. Further, it is possible to suppress deterioration of image quality to be generated when the unit image information correcting unit corrects the unit image information, to a minimum.

(16) In the rear projection type multi-projection display according to the exemplary embodiments of (15), the display preferably further includes an automatic optical element correcting device to capture an adjusting image in certain circumstances to automatically correct the position and/or orientation of the optical element.

According to the above structure, for example, when correction of the optical elements is required (for example, when three months have lapsed after re-acquisition), or at a regularly scheduled time everyday (for example, at 4 a.m.), the automatic optical element correcting device automatically operates to correct the position and/or orientation of the optical elements. Accordingly, it is possible to maintain uniformly the image quality without bothering the user to enhanced and/or improve the convenience.

(17) In the rear projection type multi-projection display according to the above (3) or (4), the external light state evaluating unit further has a function of automatically evaluating the state of the external light by capturing the transmissive screen in certain circumstances.

The certain circumstances refer to a case when a power supply is supplied to the rear projection type multi-projection display or at thirty minute after supplying the power supply to the rear projection type multi-projection display.

(18) In the rear projection type multi-projection display according to any one of the above (1) to (17), the light source is preferably a solid-state light source.

According to the above structure, since the LED light sources which can acquire a stable emitting state immediately after being turned on is used as light sources of the projector units, it is possible to drastically shorten the time required until the image-capturing device captures the predetermined region of the adjusting image to be projected onto the transmissive screen for every projector unit. As a result, the adjustment time for matching the projection images from the respective projector units is drastically shortened, which greatly enhances and/or improves the convenience of the display device.

In addition, according to the rear projection type multi-projection display of exemplary embodiments of the present invention, since the LED light sources can be easily set to a turned-on state or a turned-off state, a shutter that makes the apparatus complicated is no longer needed. Also, since the LED light sources can acquire the stable emitting state immediately after being turned on, it is possible to begin capturing at once. Further, the time needed to operate the shutter can be shortened, and thus the adjustment time can be further shortened.

Further, according to the rear projection type multi-projection display of exemplary embodiments of the present invention, since the output of the solid-state light source is varied in response to the intensity of the external light, it is possible to perform the adjustment operation with a proper intense light compared with the intensity of the external light. Therefore, it is possible to capture accurately the projection images at any time. In this case, even though the output of the solid-state light source changes high or low, the color temperature is not almost changed. Thus, it does not affect on the captured result.

In the rear projection type multi-projection display according to the above (18), the solid-state light source may be an LED light source, a semiconductor laser light source, a solid-state laser light source, or an EL light source.

According to the above structure, a stable emitting state can be obtained to perform easily the adjustment operation, and the rear projection type multi-projection display also has a sufficient brightness and color-rendering property.

(19) The rear projection type multi-projection display according to any one of the above (18) preferably further includes a solid-state light source control unit to control the amount of light emitted from the solid-state light source separately for every projector unit.

In the rear projection type multi-projection display, generally, due to unevenness in characteristic in the light source or the electro-optical modulating device, it is the present situation that a brightness characteristic or a color characteristic for every projector unit is different. For this reason, in the rear projection type multi-projection display, a voltage to be applied to the electro-optical modulating device for every projector unit, is adjusted such that the difference of the brightness characteristics or the color characteristics is absorbed. As a result, in the rear projection type multi-projection display, by performing the adjustment, the gradation source is needed to be used in the electro-optical modulating device, which results in problems in that the number of effective gradations inherent in the rear projection type multi-projection display is lowered or the dynamic range becomes narrow.

To the contrary, according to the rear projection type multi-projection display of exemplary embodiments of the present invention, by controlling the amount of light emitted from the solid-state light source for every projector unit, it is possible to absorb the difference of the brightness characteristics or the color characteristics. For this reason, according to the rear projection type multi-projection display of exemplary embodiments of the present invention, since there is no need to use the gradation source in the electro-optical modulating device, there is no case in which the number of effective gradations inherent in the rear projection type multi-projection display is lowered or the dynamic range becomes narrow.

In this case, in order to absorb the difference of the brightness characteristic for every projector unit, in the projector units other than the projector unit having the lowest brightness level, the amount of light emitted from the solid-state light source is preferably lowered such that the brightness level in the projector units complies with the brightness level in the projector unit having the lowest brightness level.

Further, in order to absorb the difference of the color characteristic for every projector unit, it is preferable to perform the above-mentioned adjustment for every color light component.

Moreover, in the rear projection type multi-projection display of the invention, unlike a case in which the high pressure mercury lamp or the metal halide lamp is used as the light source, even though the output of the solid-state light source changes high or low, the color temperature is not almost changed. Thus, there is no deterioration of the image quality.

In the rear projection type multi-projection display according to the above (19), the solid-state light source control unit preferably has a function of dynamically controlling the amount of light emitted from the solid-state light source.

According to the above function, in the case in which a totally dark screen is displayed (for example, a case in which a night scene in a movie is displayed), instead of or in addition to lowering the transmittance of the electro-optical modulating device, by decreasing the amount of light emitted from the solid-state light source, it is possible to make an entire screen dark. Further, in the case in which a totally bright screen is displayed (for example, a case in which an outdoor scene in the daytime in a movie is displayed), instead of or in addition to increasing the transmittance of the electro-optical modulating device, by increasing the amount of light emitted from the solid-state light source, it is possible to make the entire screen bright. For this reason, it is possible to increase the number of effective gradations or the dynamic range, which results in a high image quality multi-projection display having an excellent black level.

In this case, if the solid-state light source control unit is allowed to dynamically control the amount of light emitted from the solid-state light source, when an image in which a bright screen and a dark screen exist in one screen is displayed, it is possible for the rear projection type multi-projection display to exhibit the expression ability exceeding the number of effective gradation or the dynamic range inherent in the rear projection type multi-projection display. In addition, it is possible to perform high image quality display.

In the rear projection type multi-projection display according to the above (19), the solid-state light source control unit preferably has a function of controlling a voltage to be supplied to the solid-state light source for every projector unit or for every electro-optical modulating device.

According to the above function, it is possible to easily decrease or increase the amount of light emitted from the solid-state light source for every projector unit or for every electro-optical modulating device.

In the rear projection type multi-projection display according to the above (19), the solid-state light source control unit preferably has a function of controlling an emitting period of the solid-state light source for every projector unit or for every electro-optical modulating device.

According to the above function, it is also possible to easily decrease or increase the amount of light emitted from the solid-state light source for every projector unit or for every electro-optical modulating device.

In the rear projection type multi-projection display according to the above (19), preferably, the electro-optical modulating device is a liquid crystal device which writes one unit screen information twice or more, and the solid-state light source control unit has a function of allowing the solid-state light source to emit during one frame outside at least the first writing period of the liquid crystal device.

In the rear projection type multi-projection display using the liquid crystal device as the electro-optical modulating device, since the liquid crystal device is a hold type display device, unlike a case of a CRT of an impulse type display device, there is a problem in that a smooth moving picture display is not obtained due to a so-called tailing phenomenon (as regards the tailing phenomenon, see 'image quality of moving picture display in a hold type display' (IEICE Technical Report, EID99-10, pages 55 to 60 (1999-06)).

To the contrary, according to above the rear projection type multi-projection display, by performing writing twice or more to one unit screen information, it is possible to make a flicker inconspicuous. Further, a liquid crystal device of a so-called n-time speed driving (here, n is a natural number of 2 or more) is used and the solid-state light source is allowed to emit outside at least the first writing period of the liquid crystal device. Thus, it becomes possible to project intermittently the projection images onto the transmissive screen. For this reason, it is possible to alleviate the tailing phenomenon which is a defect of the hold type display, and further it is possible to perform moving picture display smoothly with favorable quality.

Further, according to the above rear projection type multi-projection display, the solid-state light source is allowed to emit during one frame outside the first writing period at which liquid crystal molecules do not yet sufficiently response. Thus, there is also an advantage in that it is possible to further enhance and/or improve contrast in the rear projection type multi-projection display.

In the above rear projection type multi-projection display, it is preferable that the electro-optical modulating device be a liquid crystal device which writes an image sequentially for every screen region, and the solid-state light source control unit has a function of allowing the solid-state light source to emit during one frame outside the image writing periods of the liquid crystal device.

For this reason, according to the above rear projection type multi-projection display, during one frame or the like, a liquid crystal device which is capable of making a flicker inconspicuous by writing sequentially images for every screen region is used, and the solid-state light source is allowed to emit outside the image writing periods of the liquid crystal device. Thus, it becomes possible to project intermittently the projection images onto the transmissive screen. For this reason, it is possible to alleviate the tailing phenomenon which is a defect of the hold type display, and further it is possible to perform moving picture display smoothly with favorable quality.

Further, according to the above rear projection type multi-projection display of exemplary embodiments of the invention, the solid-state light source is allowed to emit outside the image writing periods. Thus, there is also an advantage in that it is possible to further enhance and/or improve contrast in the rear projection type multi-projection display.

BRIEF DESCRIPTION OF THE DRAWINGS

FIGS. 1A-B are schematic diagrams showing a construction of a rear projection type multi-projection display according to a first exemplary embodiment;

FIG. 7 is a schematic diagram illustrating advantages of the rear projection type multi-projection display according to the first exemplary embodiment;

FIG. 8 is a schematic diagram illustrating advantages of the rear projection type multi-projection display according to the first exemplary embodiment;

FIGS. 12A-C are schematic diagrams illustrating advantages of the rear projection type multi-projection display according to the first exemplary embodiment;

FIGS. 17A-B are schematic diagrams illustrating advantages of the rear projection type multi-projection display according to the third exemplary embodiment;

FIGS. 18A-B are schematic diagrams illustrating a construction of a rear projection type multi-projection display according to a fourth exemplary embodiment;

FIGS. 20A-B are schematic diagrams illustrating a construction of a rear projection type multi-projection display according to a fifth exemplary embodiment;

FIG. 21 is a schematic block diagram illustrating an outline of the rear projection type multi-projection display according to the fifth exemplary embodiment;

FIGS. 25A-B are schematic diagrams illustrating advantages of a rear projection type multi-projection display according to a seventh exemplary embodiment;

FIG. 26 is a schematic diagram illustrating advantages of a rear projection type multi-projection display according to an eighth exemplary embodiment;

DETAILED DESCRIPTION OF PREFERRED EMBODIMENTS

First Exemplary Embodiment

Figure 2:
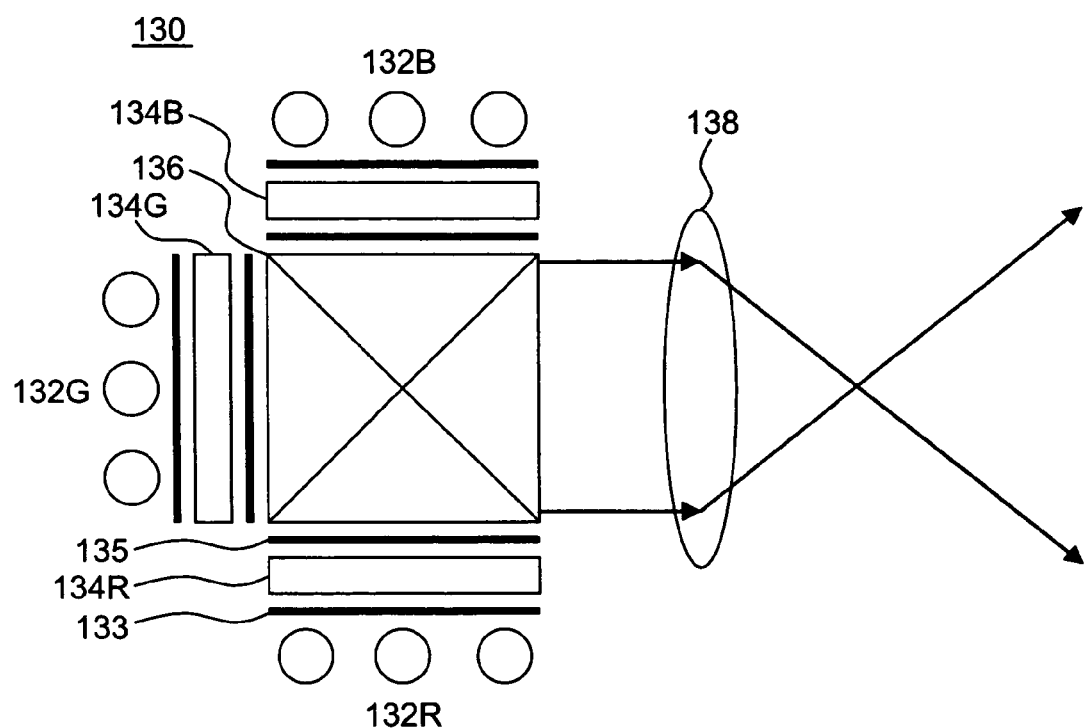
FIG. 2 is a schematic diagram showing a construction of a projector unit in the rear projection type multi-projection display according to the first exemplary embodiment.
Figure 3:
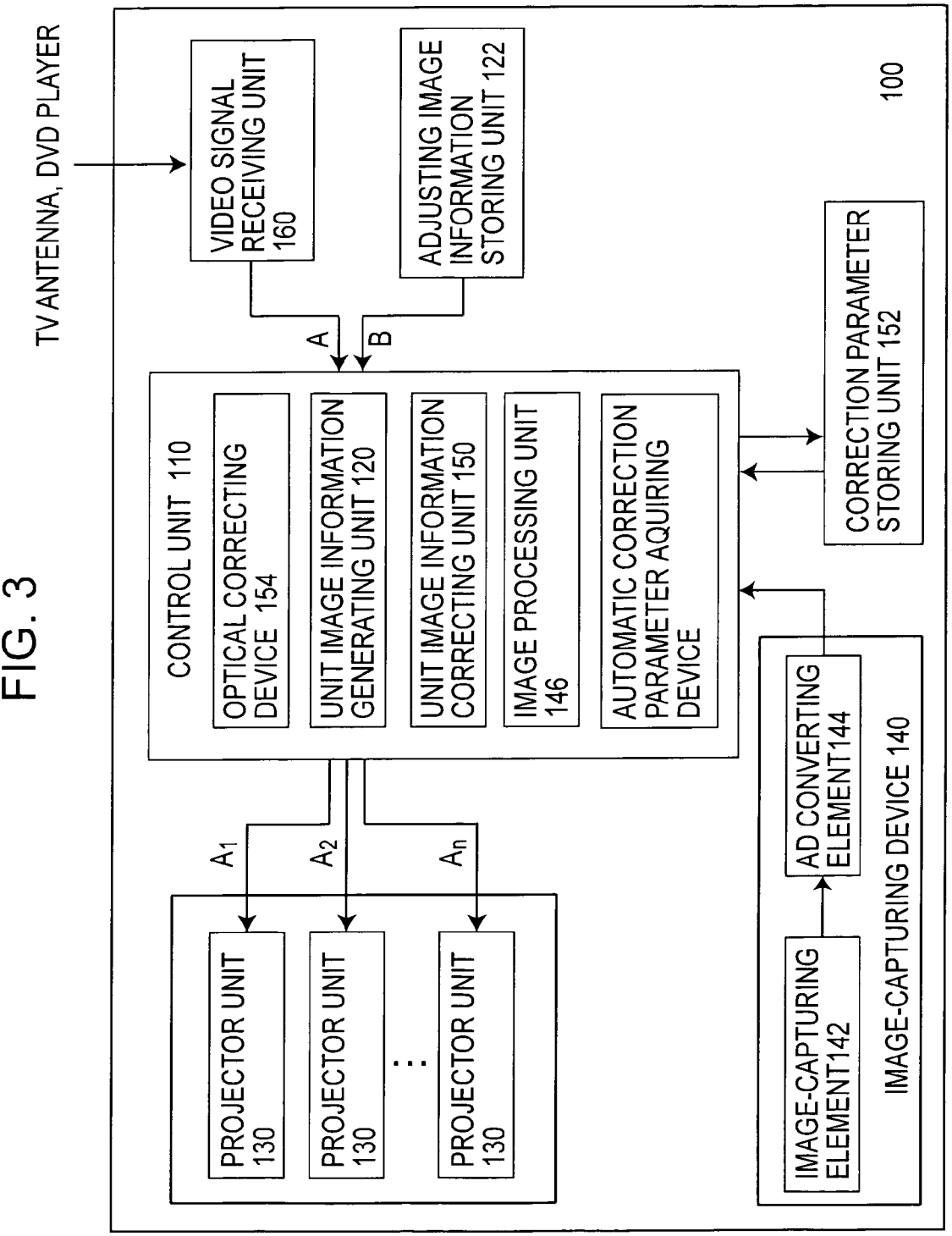
FIG. 3 is a schematic block diagram showing an outline of the rear projection type multi-projection display according to the first exemplary embodiment.
Figure 4:
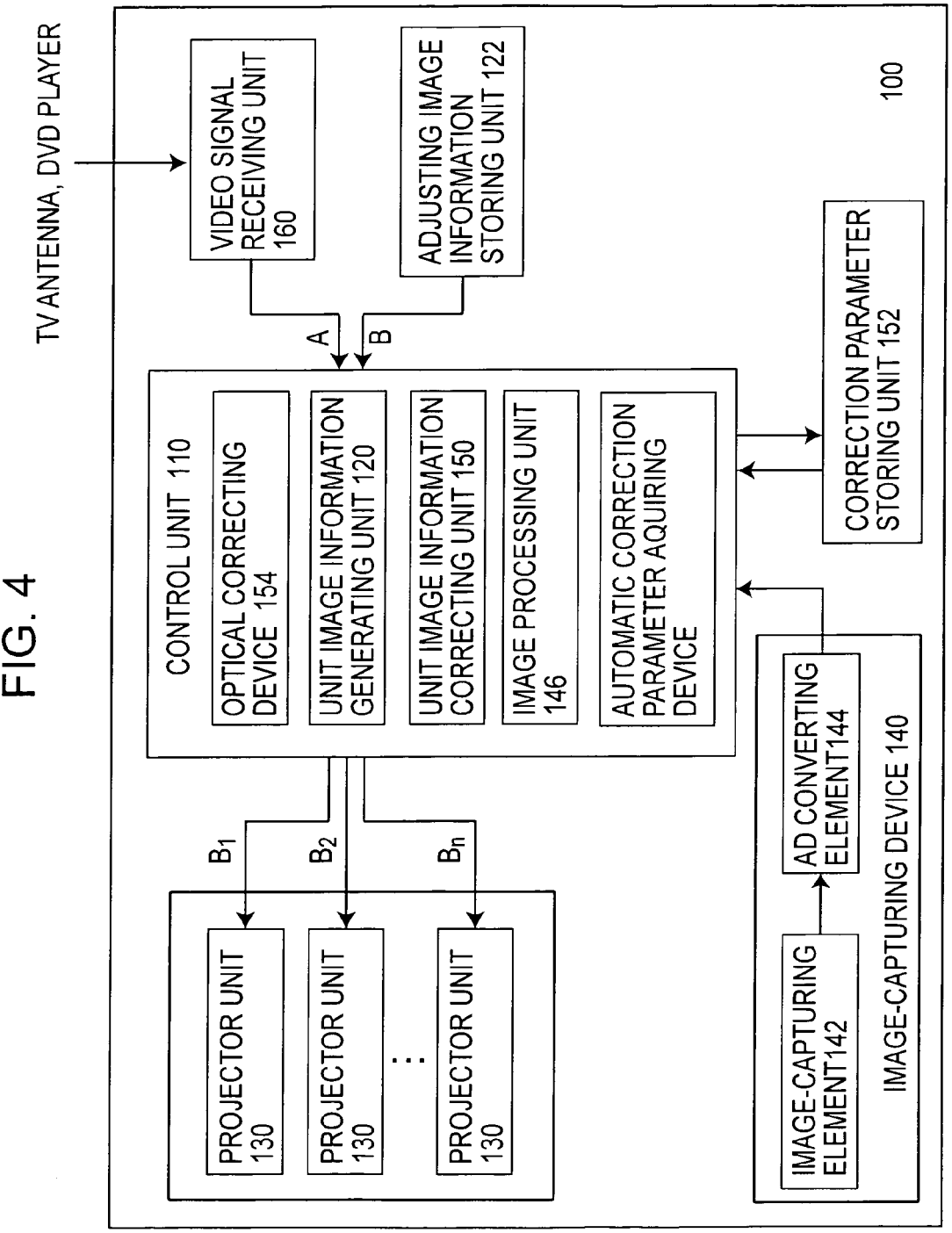
FIG. 4 is a schematic block diagram showing an outline of the rear projection type multi-projection display according to the first exemplary embodiment.
Figure 5:
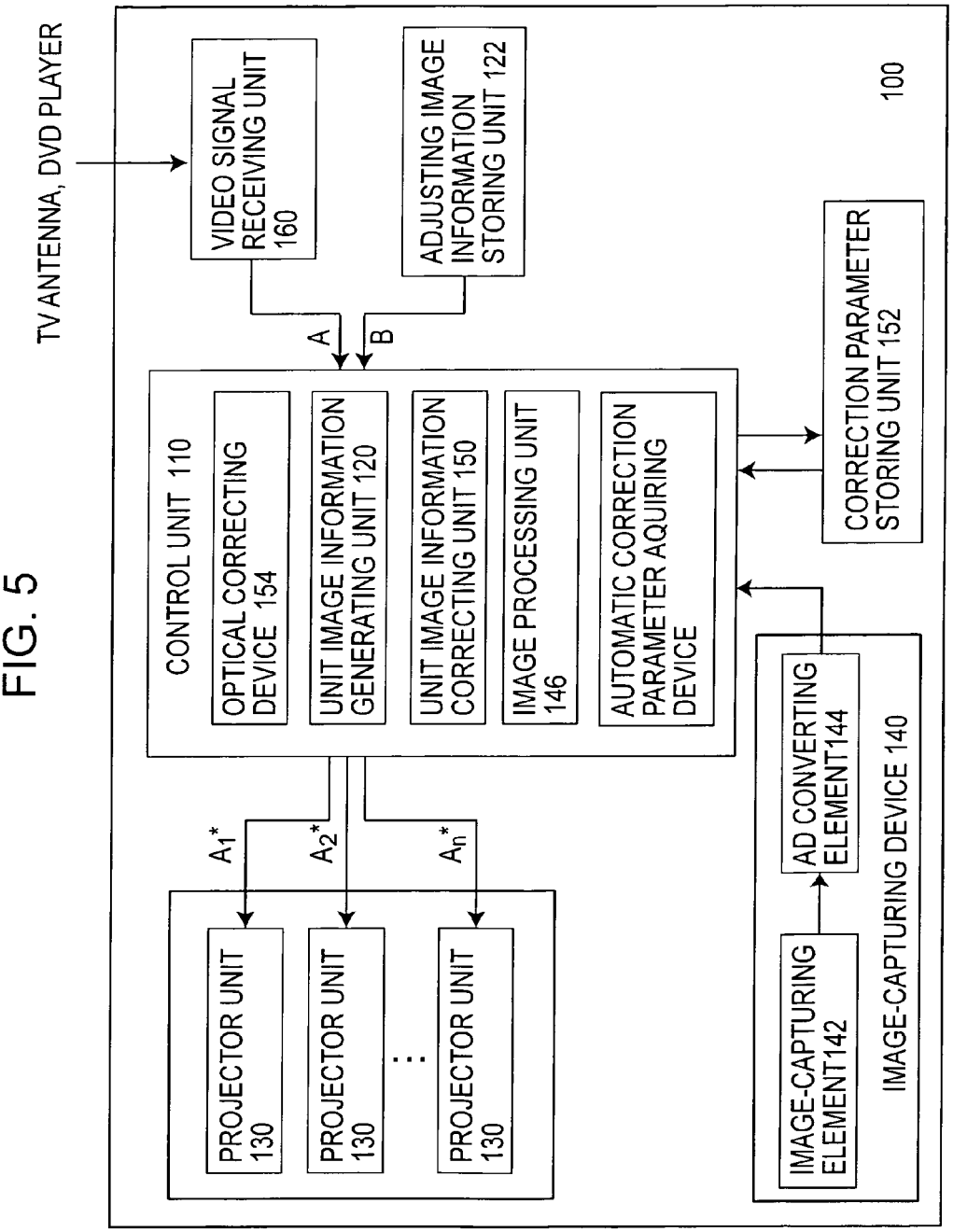
FIG. 5 is a schematic block diagram showing an outline of the rear projection type multi-projection display according to the first exemplary embodiment.

FIGS. 1A-B are schematic diagrams showing a construction of a rear projection type multi-projection display according to a first exemplary embodiment. FIG. 1A is a schematic cross-sectional view as viewed from a side and FIG. 1B is a schematic front view. FIG. 2 is a schematic diagram showing a construction of a projector unit in the rear projection type multi-projection display according to the first exemplary embodiment. FIGS. 3 to 5 are schematic block diagrams showing an outline of the rear projection type multi-projection display according to the first exemplary embodiment.

In the rear projection type multi-projection display 100 according to the first exemplary embodiment, projection images from four projector units 130 (in FIG. 1A, only two projector units are shown) which are arranged in a housing 102 are reflected by reflectors 104 to be projected onto a transmissive screen 108, as shown in FIGS. 1A-B. As shown in FIG. 2, the respective projector units 130 includes LED light sources 132R, 132G, and 132B as a solid-state light source, three liquid crystal devices 134R, 134G, and 134B as an electro-optical modulating device, a cross dichroic prism 136 and a projection lens 138. Illumination light components from the LED light sources 132R, 132G, and 132B are modulated by the liquid crystal devices 134R, 134G, and 134B based on unit image information $A_1$ to $A_n$ (see FIG. 3) or adjusting unit image information $B_1$ to $B_n$ (see FIG. 4) and are projected by the projection lens 138.

The rear projection type multi-projection display 100 according to the first exemplary embodiment includes a control unit 110 having a unit image information generating unit 120, a unit image information correcting unit 150, an image processing unit 146, and an optical correcting device 154, four projector units 130, 130, 130, 130 an image-capturing device 140, a video signal receiving unit 160, an adjusting image information storing unit 122, and a correction parameter storing unit 152, as shown in FIGS. 3 to 5.

The unit image information generating unit 120 has a function of generating a plurality of unit image information $A_1$ to $A_n$ based on original image information A (see FIG. 3) and a function of generating the adjusting unit image information $B_1$ to $B_n$ based on the adjusting image information B (see FIG. 4).

The image-capturing device 140 includes an image-capturing element 142 to capture a predetermined region of an adjusting image projected onto the transmissive screen 108 and an AD converting element 144 to convert an analog signal from the image-capturing element 142 into a digital signal.

The image processing unit 146 has a function of comparing a result obtained by performing an image processing on the result captured by the image-capturing device 140 with the adjusting image information B to output the comparison result to the unit image information correcting unit 150.

The unit image information correcting unit 150 has a function of correcting unit image information based on the result captured by the image-capturing device 140 such that a boundary between unit images projected by adjacent projector units among the plurality of projector units 130, is not noticeable on the transmissive screen 108. Thus, corrected unit image information $A_{1*}$ to $A_{n*}$ are outputted to the respective projector units 130 (see FIG. 5).

The correction parameter storing unit 152 has a function storing correction parameter to be used when the unit image information correcting unit 150 corrects the unit image information.

The adjusting image information storing unit 122 has a function of storing information regarding adjusting images which are objects to be captured by the image-capturing device 140.

In the rear projection type multi-projection display 100 of the first exemplary embodiment, as shown in FIG. 1A, the image-capturing device 140 is provided in a housing 102 of the rear projection type multi-projection display 100, and has an image-capturing element 142 to capture a projection image from the rear surface of the transmissive screen 108.

Accordingly, according to the rear projection type multi-projection display 100 of the first exemplary embodiment, if the image-capturing device 140 is provided in the housing 102 of the rear projection type multi-projection display 100 in an appropriate position, there is no need to rearrange the image-capturing device 140 after capturing image, such as in the related art. As a result, the adjustment operation is easily performed in a reduced time.

In addition, according to the rear projection type multi-projection display 100 of the first exemplary embodiment, it is easy to provide the image-capturing device 140 in a precise position with respect to the transmissive screen 108. Therefore, it is possible to capture the adjusting images more accurately and easily, compared to the related art.

Further, according to the rear projection type multi-projection display 100 of the first exemplary embodiment, it is easy to put the control circuit for processing a result captured by the image-capturing device 140 in the housing 102 and as a result, it is easy to move and install the rear projection type multi-projection display.

Therefore, the rear projection type multi-projection display 100 having a small size can be used commercially and in homes.

In addition, according to the rear projection type multi-projection display 100 of the first exemplary embodiment, since the image-capturing device 140 is arranged in the housing 102 of the rear projection type multi-projection display 100, the intensity of external light incident to the image-capturing device 140 can be decreased. Therefore, it is possible to precisely capture the adjusting image, compared to the related art, without providing a light-shielding device for shielding the external light. As a result, there is no need to provide the light-shielding device every time the projection images are captured as in the related art, and the adjustment operation is easily performed in a reduced time.

Further, according to the rear projection type multi-projection display 100 of the first exemplary embodiment, since the LED light sources 132R, 132G, and 132B which can acquire a stable emitting state immediately after being turned on is used as light sources of the projector units 130, it is possible to drastically shorten the time required until the image-capturing device 140 captures the predetermined region of the adjusting image to be projected onto the transmissive screen 108 for every projector unit 130. As a result, the adjustment time for matching the projection images from the respective projector units 130 is drastically shortened, which greatly enhances the convenience of the display device.

Further, according to the rear projection type multi-projection display 100 of the first exemplary embodiment, since the LED light sources 132R, 132G, and 132B can be easily set to a turned-on state or a turned-off state, a shutter used in the above mentioned related art document Japanese Unexamined Patent Application Publication No. 2001-339672 is no longer needed. Also, since the LED light sources 132R, 132G, and 132B can acquire the stable emitting state immediately after being turned on, it is possible to begin capturing at once. Further, the time needed to operate the shutter can be shortened, and thus the adjustment time can be further shortened.

Further, according to the rear projection type multi-projection display 100 of the first exemplary embodiment, since the LED light sources 132R, 132G, and 132B are used as the solid-state light source, in addition to having a stable emitting state, the rear projection type multi-projection display also has a sufficient brightness and color-rendering property.

In the rear projection type multi-projection display 100 according to the first exemplary embodiment, the image-capturing device 140 changes the capturing range S (see FIG. 1A). Therefore, it is possible to capture images with a wide capturing range and a high magnification and to capture efficiently the projection image in various capturing modes.

The capturing range S is changed by varying the position or orientation of the image-capturing device 140 or by varying the construction of an optical system such as lens in the image-capturing device 140.

The image-capturing device 140 further has a zoom-function and an auto-focus function. Therefore, since it is possible to change the capturing range S or the magnifications, the degree of freedom or flexibility of capturing is enhanced. Further, since the focus is automatically adjusted, the convenience is greatly enhanced.

In the rear projection type multi-projection display 100 according to the first exemplary embodiment, since the image-capturing device 140 can capture the entire transmissive screen 108, it is possible to enhance the color balance and brightness balance in the entire screen.

In the rear projection type multi-projection display 100 according to the first exemplary embodiment, the unit image information correcting unit 150 corrects unit image information based on the result of capturing the adjusting unit images which are projected by each of the projector units 130.

The unit image information correcting unit 150 may correct unit image information based on the result of capturing a general image. However, in the present exemplary embodiment, by correcting unit image information based on the result of capturing the adjusting unit images, it is possible to correct more accurately and rapidly.

As the adjusting unit image, various unit images suitable for correcting the unit image information, such as a beta image of white or monochrome, a lattice shape of monochrome, may be used.

In this case, it is preferable to store the adjusting image information in the adjusting image information storing unit 122 in advance and to generate the adjusting unit images by the unit image information generating unit 120 using the adjusting image information at the time of the adjustment operation. Further, the adjusting unit image information may be stored in the adjusting image information storing unit 122 in advance and at the time of the adjustment operation, the adjusting unit image information may be used as it is.

Further, every when the adjustment operation is performed, the adjusting image information may be inputted in the adjusting image information storing unit 122 (by means of a DVD or the like) and the unit image information generating unit 120 may generate the adjusting unit image information using the adjusting image information. Further, even when the adjustment operation is performed, the adjusting unit image information may be directly inputted in the adjusting image information storing unit 122.

In the rear projection type multi-projection display 100 according to the first exemplary embodiment, the unit image information correcting unit 150 has a function of correcting the shapes, the positions and/or the inclinations of the unit images to be projected by the respective projector units 130. For this reason, the shapes, the positions and/or the inclinations between the projection images from the respective projector units 130 become proper, and thus it is possible to highly match the projection images from the respective projector units 130.

In the rear projection type multi-projection display 100 according to the first exemplary embodiment, the unit image information correcting unit 150 has another function of correcting the brightness and/or colors of the unit images to be projected by the respective projector units 130. For this reason, the brightness and/or colors between the projection images from the respective projector units 130 become proper, and thus it is possible to highly match the projection images from the respective projector units 130.

In the rear projection type multi-projection display 100 according to the first exemplary embodiment, the unit image information correcting unit 150 has a function of correcting the brightness and/or colors for every pixel in a plurality of projector units 130. Accordingly, since the matching between the projection images from the respective projector units 130 is enhanced, it is possible to project the image true to the original image information to the transmissive screen 108.

In the rear projection type multi-projection display 100 according to the first exemplary embodiment, the unit image information correcting unit 150 has another function of correcting the brightness and/or colors for every pixel in the respect projector units 130 by comparing all of the adjusting images formed by a plurality of adjusting unit images projected by the plurality of projector units 130 with the original adjusting image.

In the rear projection type multi-projection display 100 according to the first exemplary embodiment, the unit image information correcting unit 150 corrects the unit image information by using a correction parameter determined based on the captured result. Therefore, after determining the correction parameter based on the captured result, it is possible to easily correct the unit image information by using the determined correction parameter.

The rear projection type multi-projection display 100 according to the first exemplary embodiment further includes the correction parameter storing unit 152 to store the correction parameter, as mentioned above. Therefore, it is possible to reduce the necessary storage capacity, compared with the case of storing the captured results and to reduce the calculation amount when correcting the unit image information.

The rear projection type multi-projection display 100 according to the first exemplary embodiment further includes an automatic correction parameter acquiring device (see FIGS. 3-5) to acquire automatically the correction parameter by capturing the adjusting image in certain circumstances. For example, when the re-determination (re-acquisition) of the correction parameter is required (for example, when three months have passed since re-acquisition), the automatic correction parameter acquiring device automatically operates to re-acquire the correction parameter. Further, the automatic correction parameter acquiring device automatically operates at a specific time everyday (for example, at 4 a.m.) to re-acquire the correction parameter. Accordingly, it is possible to maintain uniformly the image quality without bothering user to enhance the convenience.

Further, even though the property of the LED light source 132R, 132G, and 132B or the liquid crystal device 134R, 134G, and 134B varies with response to the variation over time, it is possible to obtain automatically the correction parameter corresponding to the variation of property. Therefore, the deterioration of the image quality due to the variation over time can be reduced or prevented.

The rear projection type multi-projection display 100 according to the first exemplary embodiment further includes an optical correcting device 154 to correct the position and/or orientation of optical elements in the rear projection type multi-projection display 100. Therefore, after correcting the position and/or orientation of the optical elements, the uniform image quality can be obtained. Since this correction is optically performed, the image quality does not deteriorate by performing the adjustment operation.

In the rear projection type multi-projection display 100 according to the first exemplary embodiment, the position and/or orientation of the optical elements is optically corrected, the capturing operation is performed again by using the image-capturing device 140, and then the correction parameters are determined based on the captured result. According to the above operation, after rough correction is optically performed, detail correction is electronically performed. Therefore, it is possible to reduce the deterioration of the image quality that is generated when correcting the unit image information by the unit image information correcting unit 150.

The rear projection type multi-projection display 100 further has an automatic optical element correcting device (not shown) to correct automatically the position and/or orientation of the optical elements by capturing an adjusting image in certain circumstances. Therefore, when correction of the optical elements is required (for example, when three months have lapsed after re-acquisition), or at a regularly scheduled time everyday (for example, at 4 a.m.), the automatic optical element correcting device automatically operates to correct the position and/or orientation of the optical elements. Accordingly, it is possible to maintain uniformly the image quality without bothering a user to improve the convenience.

FIGS. 6 to 12 are diagrams showing advantages of the rear projection type multi-projection display according to the first exemplary embodiment.

With reference to FIGS. 3 to 12, how the rear projection type multi-projection display 100 according to the first exemplary embodiment may correct the shapes, the positions and/or the inclinations between the projection images from the respective projector units 130 will be described. Further, how the brightness and/or colors between the projection images from the respective projector units 130 may be corrected will be described.

(Display State Before Correcting)

A display state before correcting will be described.

Figure 6:
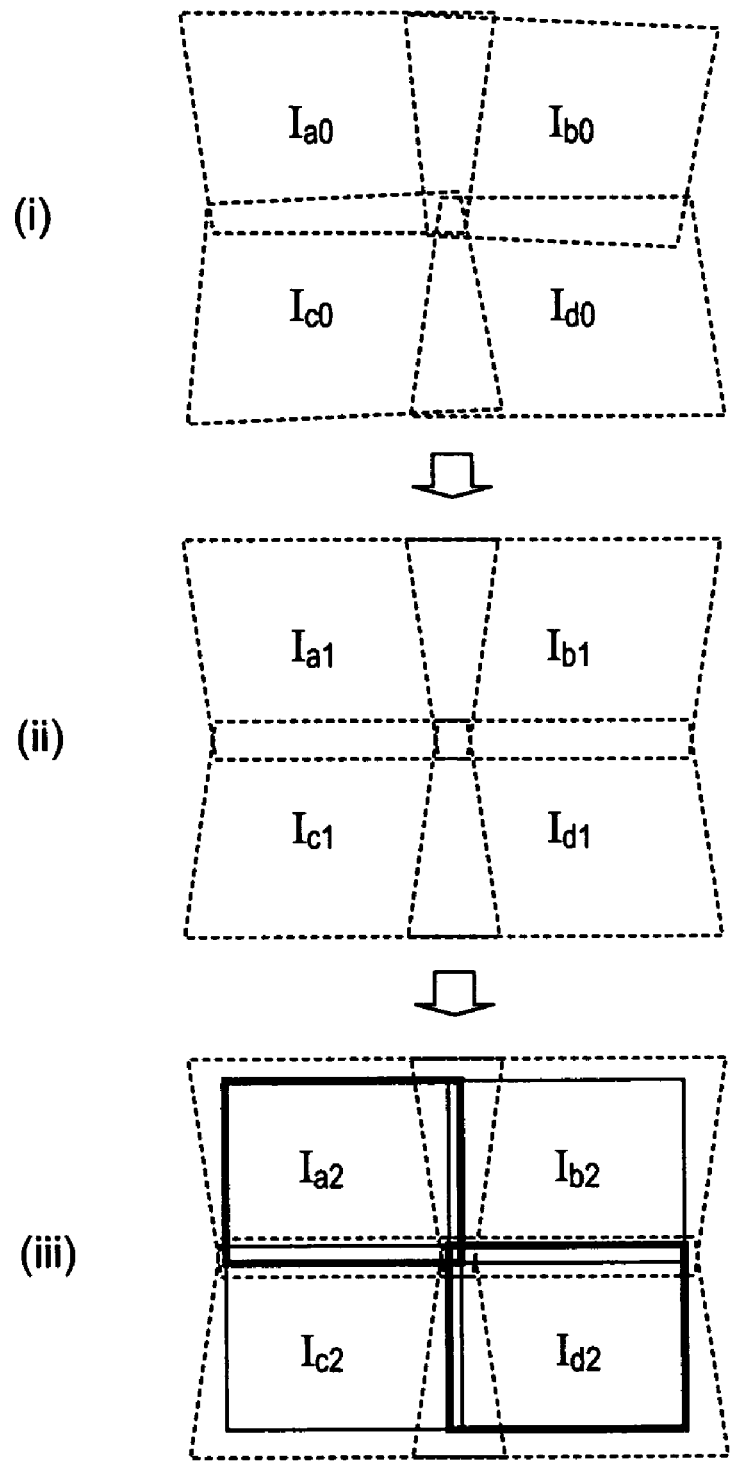
FIG. 6 is a schematic diagram illustrating advantages of the rear projection type multi-projection display according to the first exemplary embodiment.

Referring to FIG. 3, if original image information A is inputted from the video signal receiving unit 160 to the unit image information generating unit 120, the unit image information generating unit 120 generates unit image information $A_1$ to $A_n$ based on original image information A. The respective projector units 130 project the unit images corresponding to unit image information $A_1$ to $A_n$ onto the transmissive screen 108. Therefore, on the transmissive screen 108, the projection images according to the respective unit images from the respective projector units 130 are projected. In this situation, since the rear projection type multi-projection display 100 is in a state before correcting, the distorted projection images ($I_{a0}$, $I_{b0}$, $I_{c0}$, $I_{d0}$) as shown in FIG. 6(*i*) are projected.

(First Exemplary Adjustment Operation (an Adjustment Operation to the Shapes, the Positions and/or the Inclinations of the Unit Images by the Optical Correcting Unit 154))

The first adjustment operation will be described.

Referring to FIG. 4, if adjusting image information B from the adjusting image information storing unit 122 is inputted to the unit image information generating unit 120, the unit image information generating unit 120 generates adjusting unit image information $B_1$ to $B_n$ based on adjusting image information B. The respective projector units 130 project the unit images corresponding to adjusting unit image information $B_1$ to $B_n$ onto the transmissive screen 108. In this situation, since the rear projection type multi-projection display 100 is in a state before correcting, similarly to the above description, since the rear projection type multi-projection display 100 is in a state before correcting, the distorted projection images ($I_{a0}$, $I_{b0}$, $I_{c0}$, $I_{d0}$) as shown in FIG. 6(*i*) are projected.

Figure 13A:
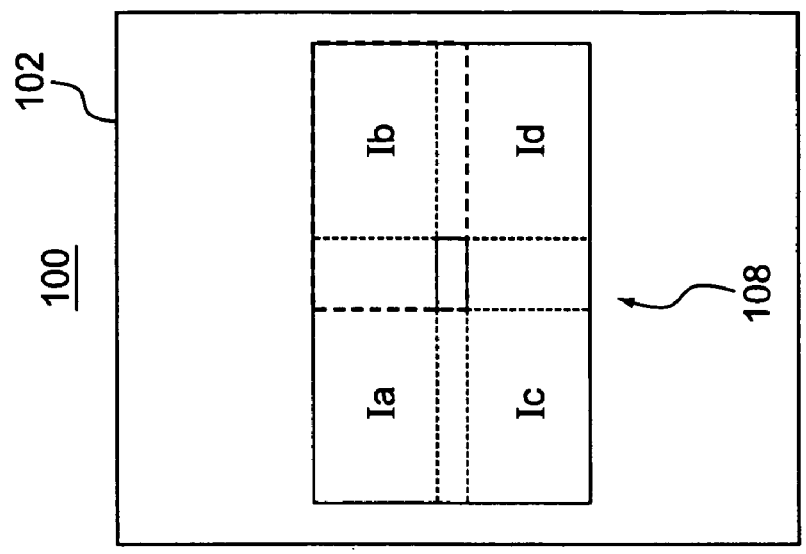
FIGS. 13A-B are schematic diagrams showing another construction of the rear projection type multi-projection display according to the first exemplary embodiment.
Figure 13B:
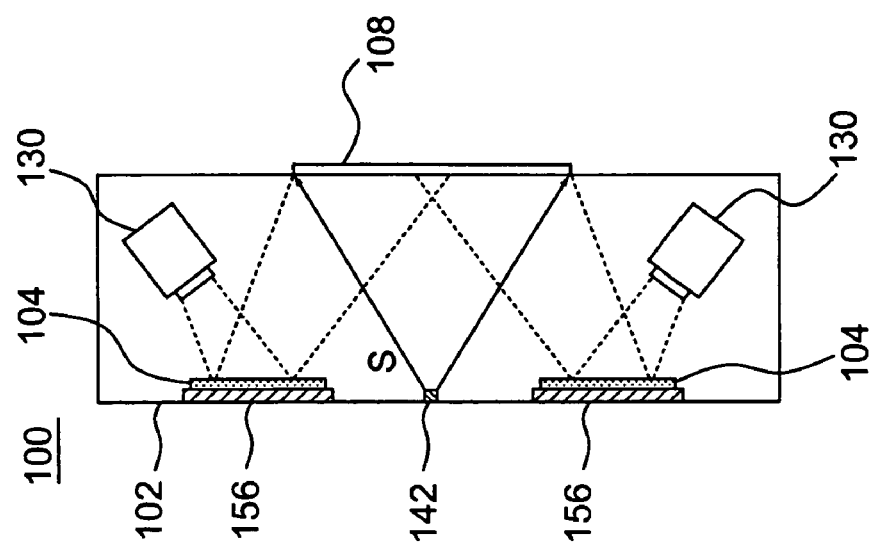

Next, with the image-capturing element 142 of the image-capturing device 140, predetermined regions of the respective projection images ($I_{a0}$, $I_{b0}$, $I_{c0}$, $I_{d0}$) relating to the adjusting images shown in FIG. 6(*i*) are captured. And then, the optical correcting device 154 optically corrects the position and/or orientation of the housing of the respective projector units 130 based on the captured result. Moreover, in exemplary embodiments of the present invention, instead of the housing of the projector units 130, the position and/or orientation of the projection lens 138 of each of the projector units 130 may be optically corrected. Further, as shown in FIG. 13, the position and/or orientation of the reflectors 104 may be optically corrected. FIG. 13 is a diagram illustrating another construction of the rear projection type multi-projection display according to the first exemplary embodiment. An actuator 156 in FIG. 13A has a function of correcting optically the position and/or orientation of the reflectors 104, as an optical correcting device.

If adjusting image information B from the adjusting image information storing unit 122 is inputted to the unit image information generating unit 120 again, the respective projector units 130 project the unit images corresponding to adjusting unit image information $B_1$ to $B_n$ onto the transmissive screen 108. In this situation, however, the position and/or orientation of the housing of the respective projector units 130 are being corrected based on the previous captured result in the rear projection type multi-projection display 100. Thus, on the transmissive screen 108, as shown in FIG. 6(*ii*), the projection images ($I_{a1}$, $I_{b1}$, $I_{c1}$, $I_{d1}$) having reduced distortion are projected.

(Second Exemplary Adjustment Operation (an Adjustment Operation to the Shapes, the Positions and/or the Inclinations of the Unit Images by the Unit Image Information Correcting Unit 150))

The second exemplary adjustment operation will be described.

Next, with the image-capturing element 142 of the image-capturing device 140, the respective projection images ($I_{a1}$, $I_{b1}$, $I_{c1}$, $I_{d1}$) according to the adjusting images shown in FIG. 6(*ii*) are captured. And then, based on the captured result, the unit image information correcting unit 150 determines the correction parameters to be used when unit image information is corrected. Subsequently, the determined correction parameters are stored in the correction parameter storing unit 152, and then, based on the correction parameters, a plurality of unit image information are generated from original image information.

Thus, if original image information A is inputted from the video signal receiving unit 160 to the unit image information generating unit 120, the unit image information generating unit 120 generates unit image information based on original image information A. In this situation, since unit image information is corrected by the correction parameters, thus, unit image information $A_{1*}$ to $A_{n*}$ are generated. Therefore, the respective projector units 130 project the unit images corresponding to unit image information $A_{1*}$ to $A_{n*}$ onto the transmissive screen 108. In this situation, since the rear projection type multi-projection display 100 is already adjusted, as shown in FIG. 6(*iii*), the projection images ($I_{a2}$, $I_{b2}$, $I_{c2}$, $I_{d2}$) from the respective projector units 130 are aligned precisely.

Moreover, in the first exemplary adjustment operation and the second exemplary adjustment operation, for example, as shown in FIG. 7 (a case in which the inclinations between the respective unit images projected exist) or FIG. 8 (a case in which the inclinations between the respective unit images projected do not exist), the correction may be performed such that reference lines of the adjusting images in adjacent two projector units 130, 130 comply with each other, or the operation may be executed such that the reference line of the adjusting image in one projector unit 130 is captured.

In both cases, it is needed to turn on only the light source in adjacent two projector units 130, 130 or it is needed to turn on only the light source in one projector unit 130.

However, according to the rear projection type multi-projection display 100 of the first exemplary embodiment, since the LED light sources 132R, 132G, and 132B which can acquire the stable emitting state immediately after being turned on are used as the light source of the respective projector units 130, it is possible to drastically shorten the time required for the above-mentioned adjustment operation.

(Third Exemplary Adjustment Operation (an Adjustment Operation to Brightness and/or Colors of the Unit Images by the Unit Image Information Correcting Unit 150))

The third exemplary adjustment operation will be described. For the purpose of simple description, an adjustment of an overlapped region in adjacent two projector units (temporarily, referred to as $PJU_a$ and $PJU_b$) will be described.

Figure 9:
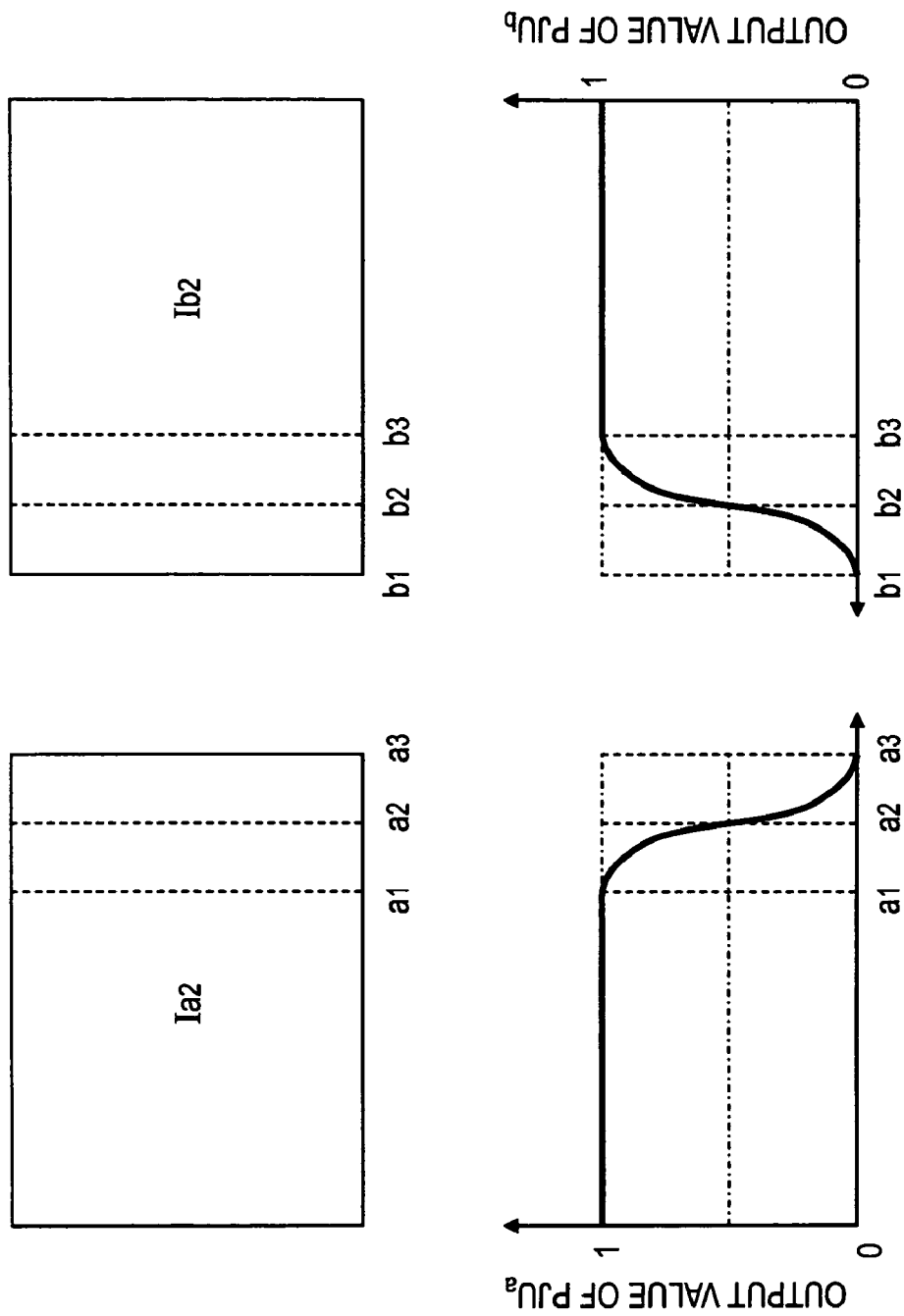
FIG. 9 is a schematic diagram illustrating advantages of the rear projection type multi-projection display according to the first exemplary embodiment.
Figure 10:
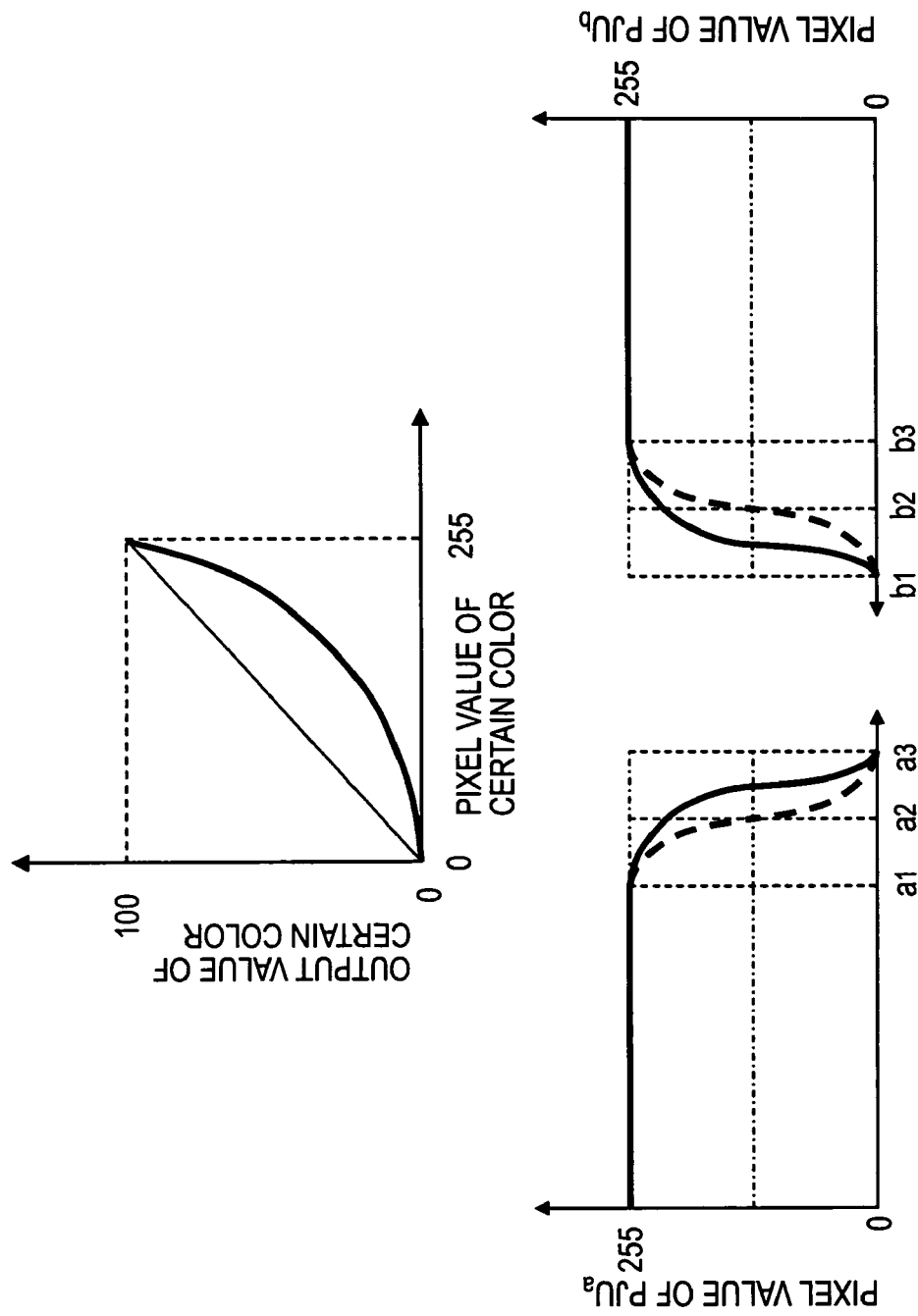
FIG. 10 is a diagram illustrating advantages of the rear projection type multi-projection display according to the first exemplary embodiment.
Figure 11:
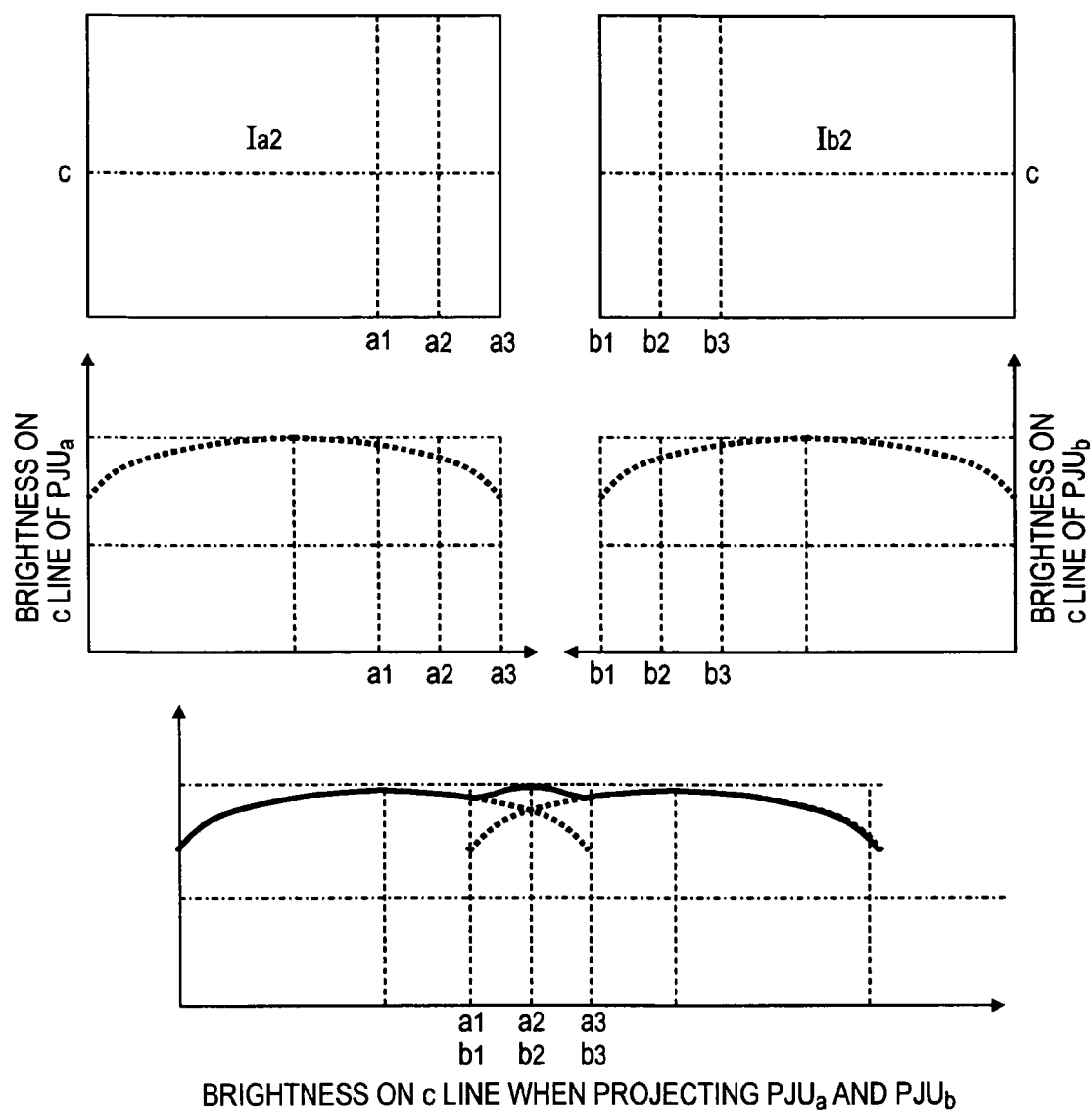
FIG. 11 is a schematic diagram illustrating advantages of the rear projection type multi-projection display according to the first exemplary embodiment.

First, as shown in FIG. 9, a weight function in the overlapped region is added to a pixel value of unit image information such that the projection images ($I_{a2}$, $I_{b2}$) from the adjacent projector units $PJU_a$ and $PJU_b$ are connected smoothly to each other. In this situation, as the weight function, as shown in FIG. 10, a weight function taking γ correction into consideration is used. By doing so, as shown in FIG. 11, the projection images from the adjacent projector units $PJU_a$ and $PJU_b$ are connected to each other. As a result, as shown in FIG. 12, the projection images from the adjacent two projector units $PJU_a$ and $PJU_b$ are favorably synthesized and smoothly connected to each other.

That is, in the rear projection type multi-projection display 100 according to the first exemplary embodiment, when two unit image information are generated based on original image information relating to an original image (FIG. 12A), the unit images (FIG. 12B) are generated such that they are smoothly connected to each other on the transmissive screen 108 (FIG. 12C). Thus, the projection images from the adjacent two projector units PJU$_a$ and PJU$_b$ are favorably synthesized and smoothly connected to each other.

Second Exemplary Embodiment

Figure 14B:
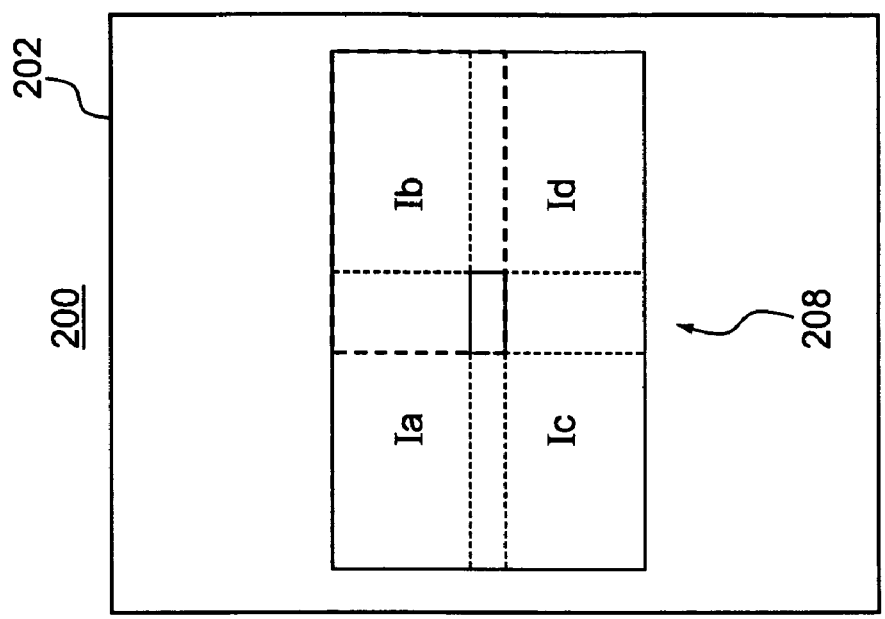
FIGS. 14A-B are schematic diagrams showing a construction of a rear projection type multi-projection display according to a second exemplary embodiment.
Figure 14A:
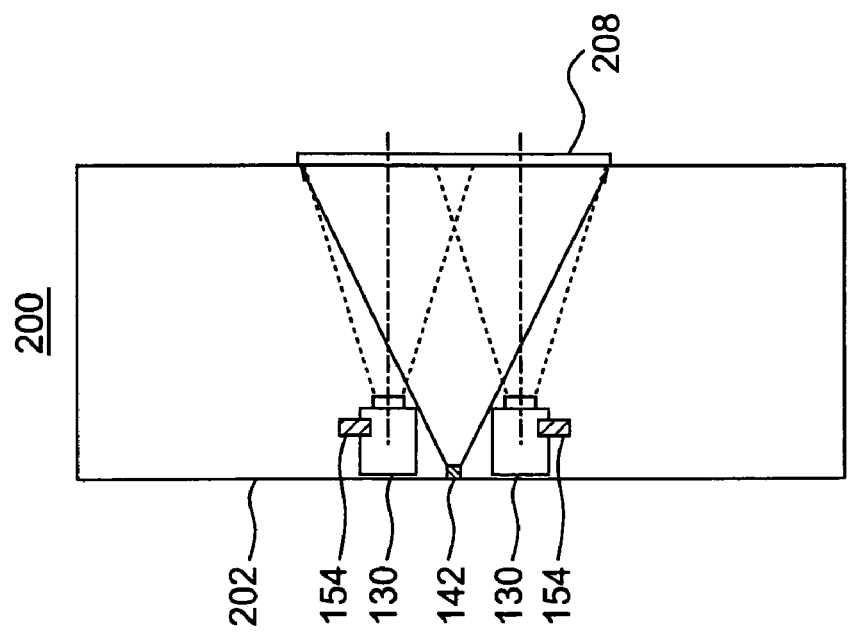
Figure 15:
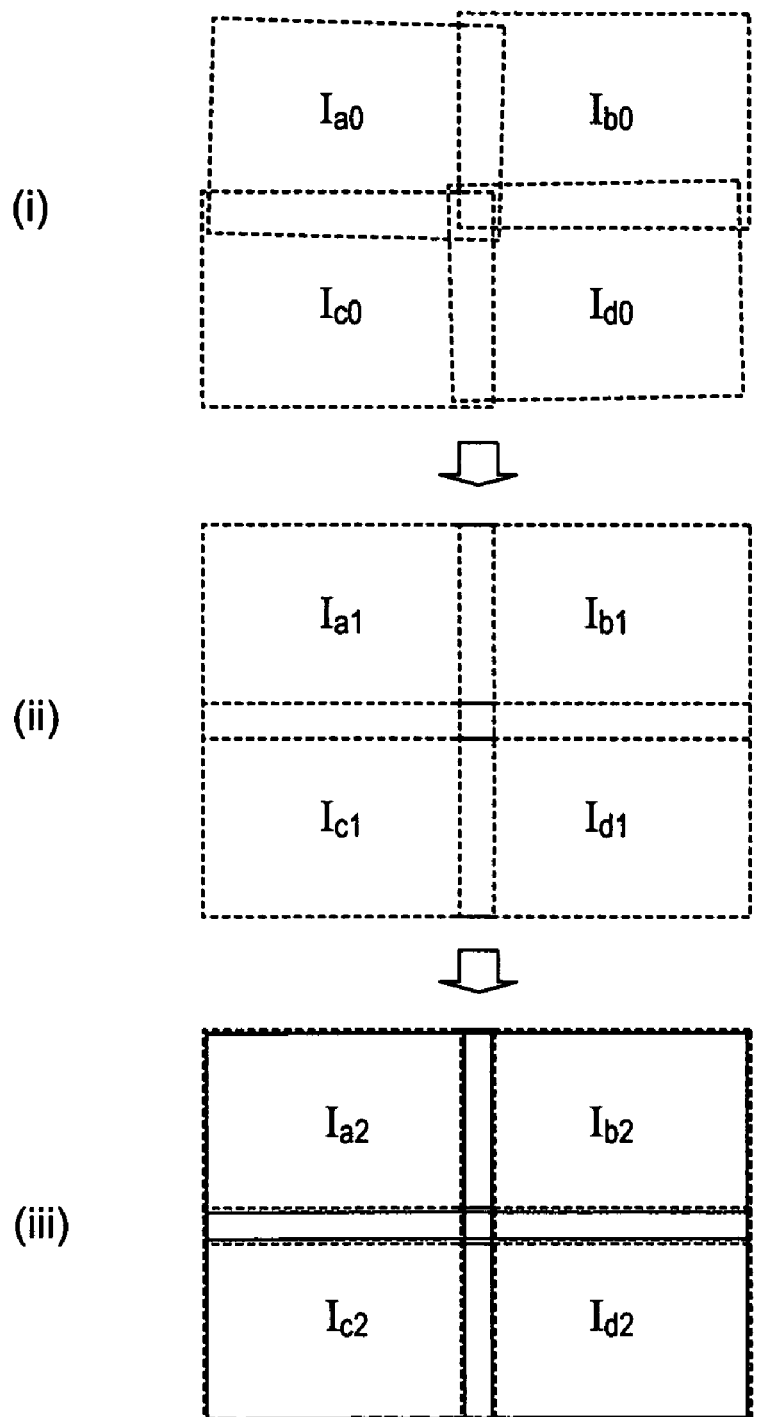
FIG. 15 is a schematic diagram illustrating advantages of the rear projection type multi-projection display according to the second exemplary embodiment.

FIGS. 14A-B are schematic diagrams showing a construction of a rear projection type multi-projection display according to a second exemplary embodiment. FIG. 15 is a schematic diagram illustrating advantages of the rear projection type multi-projection display according to the second exemplary embodiment.

The rear projection type multi-projection display 200 according to the rear projection type second exemplary embodiment is constructed such that an optical axis of a projection light flux from each of the projector units 130 is orthogonal to the screen surface of the transmissive screen 208, as shown in FIGS. 14A-B.

For this reason, the unit images from the respective projector units 130 do not have trapezoidal distortion. As a result, advantages in the rear projection type multi-projection display 200 according to the second exemplary embodiment are as shown in FIG. 15, unlike FIG. 6 showing advantages in the rear projection type multi-projection display 100 according to the first exemplary embodiment.

However, in the rear projection type multi-projection display 200 according to the second exemplary embodiment, since the image-capturing device 140 (not shown) is provided in the housing 202 to capture a projection image from rear surface of the transmissive screen 208, it is possible to obtain the same advantages as those of the rear projection type multi-projection display 100 according to the first exemplary embodiment.

Third Exemplary Embodiment

Figure 16:
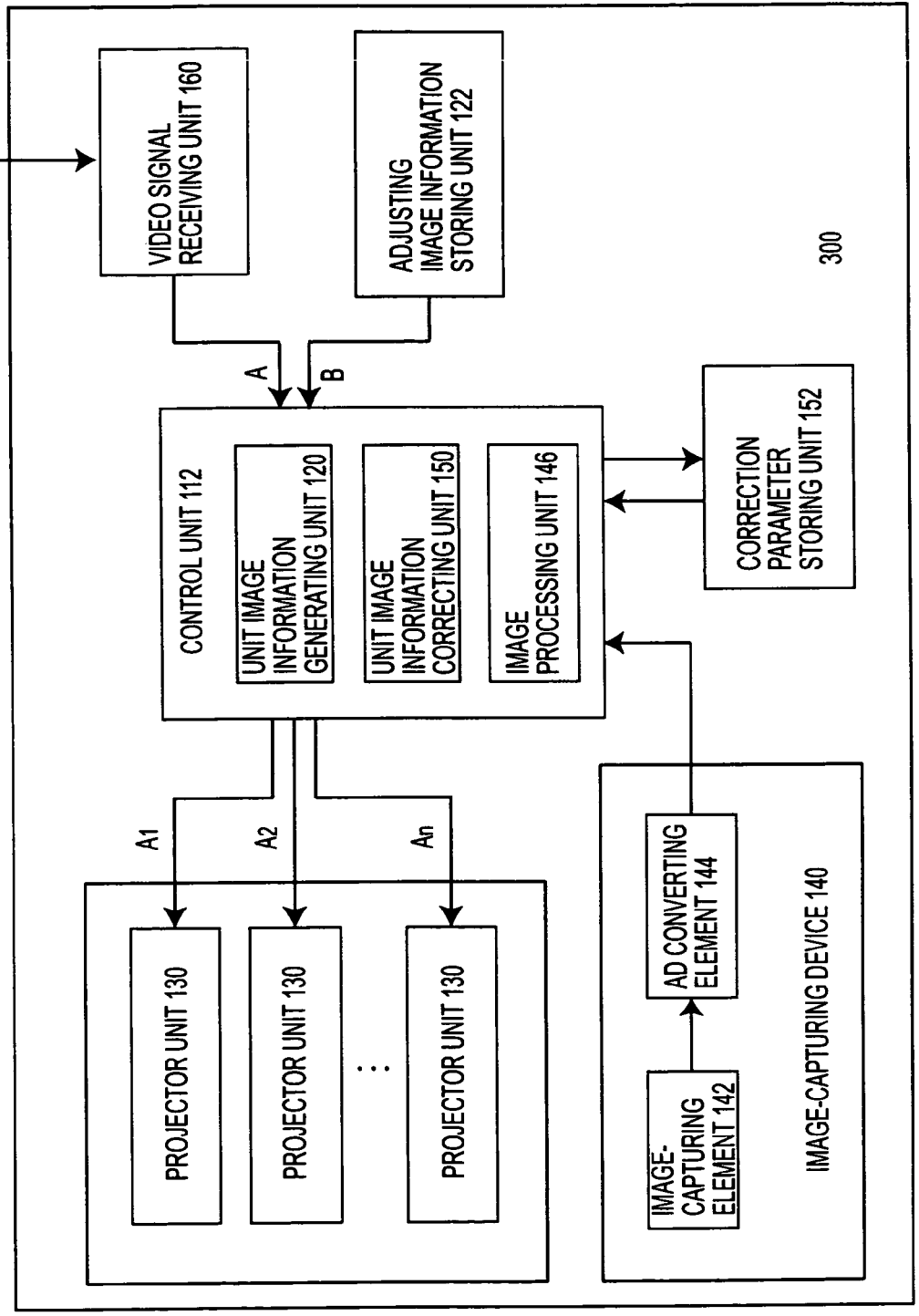
FIG. 16 is a schematic block diagram showing an outline of a rear projection type multi-projection display according to a third exemplary embodiment.

FIG. 16 is a schematic block diagram showing an outline of a rear projection type multi-projection display according to the third exemplary embodiment. FIGS. 17A-B are schematic diagrams illustrating advantages of the rear projection type multi-projection display according to the third exemplary embodiment. FIG. 17A is a diagram showing advantages in the case in which the unit image has trapezoidal distortion, and FIG. 17B is a diagram showing advantages in the case in which the unit image does not have trapezoidal distortion.

As shown in FIG. 16, the rear projection type multi-projection display 300 according to the third exemplary embodiment has a construction of a control unit different from the rear projection type multi-projection display 100 according to the first exemplary embodiment. That is, in the rear projection type multi-projection display 300 according to the third exemplary embodiment, the control unit 112 has a construction excluding the optical correcting device 154 from the construction of the control unit 110 in the rear projection type multi-projection display 100 according to the first exemplary embodiment.

However, the rear projection type multi-projection display 300 according to the third exemplary embodiment has an image-capturing device 140 which is provided in a hosing of the rear projection type multi-projection display, and captures a projection image from the rear surface of a transmissive screen. Thus, it is possible to obtain the same advantages as those of the rear projection type multi-projection display 100 according to the first exemplary embodiment.

Further, the rear projection type multi-projection display 300 according to the third exemplary embodiment can correct the unit images without using the optical correcting device. Thus, it is possible to simplify the structure. Further, it has an advantage in that it is possible to attain cost reduction and reliability enhancement. In particular, the rear projection type multi-projection display 300 can be suitably used as a rear surface projection type multi-projection display in which the projector units are fixedly arranged in the housing.

Moreover, in the rear projection type multi-projection display 300 according to the third exemplary embodiment, the unit image information is corrected only by the working of the unit image information correcting unit 150, without using the optical correcting device. Thus, hereinafter, the adjustment method will be described.

(Display State Before Correcting)

Referring to FIG. 16, if original image information A is inputted from a video signal receiving unit 160 to a unit image information generating unit 120, the unit image information generating unit 120 generates unit image information $A_1$ to $A_n$ based on the original image information A. The respective projector units 130 project the unit images corresponding to unit image information $A_1$ to $A_n$ onto the transmissive screen. Therefore, on the transmissive screen, the projection images corresponding to the respective unit images from the respective projector units 130 are projected. In this situation, since the rear projection type multi-projection display 300 is in a state before correcting, the distorted projection images ($I_{a0}$, $I_{b0}$, $I_{c0}$, $I_{d0}$) as shown in FIG. 17A(i) are projected.

(First Exemplary Adjustment Operation (an Adjustment Operation on the Shapes, the Positions and/or the Inclinations of the Unit Images by the Unit Image Information Correcting Unit 150))

The first exemplary adjustment operation will be described.

Next, if adjusting image information B is inputted from the adjusting image information storing unit 122 to the unit image information generating unit 120, the unit image information generating unit 120 generates adjusting unit image information $B_1$ to $B_n$ (not shown) based on adjusting image information B. The respective projector units 130 project the unit images corresponding to adjusting unit image information $B_1$ to $B_n$ onto the transmissive screen. In this situation, since the rear projection type multi-projection display 300 is in a state before correcting, similar to the above description, the distorted projection images ($I_{a0}$, $I_{b0}$, $I_{c0}$, $I_{d0}$) as shown in FIG. 17A(i) are projected.

Next, with an image-capturing element 142 of the image-capturing device 140, the respective projection images ($I_{a0}$, $I_{b0}$, $I_{c0}$, $I_{d0}$) relating to the adjusting images shown in FIG. 17B(i) are captured. And then, based on the captured result, the unit image information correcting unit 150 determines the correction parameters to be used when unit image information is corrected. Subsequently, the determined correction parameters are stored in the correction parameter storing unit 152, and then, based on the correction parameters, a plurality of unit image information are generated from the original image information.

Thus, if the original image information A from the video signal receiving unit 160 is inputted to the unit image information generating unit 120, the unit image information generating unit 120 generates unit image information based on the original image information A. In this regard, in this situation, since unit image information is corrected by the correction parameters, and thus unit image information $A_{1*}$ to $A_{n*}$ (not shown) are generated. Therefore, the respective projector units 130 project the unit images corresponding to unit image information $A_{1*}$ to $A_{n*}$ onto the transmissive screen. In this situation, since the rear projection type multi-projection display 300 is adjusted in advance, as shown in FIG. 17B(ii), the projection images ($I_{a2}$, $I_{b2}$, $I_{c2}$, $I_{d2}$) from the respective projector units 130 are located precisely.

(Second Exemplary Adjustment Operation (an Adjustment Operation to Brightness and/or Colors of the Unit Images by the Unit Image Information Correcting Unit 150))

The second exemplary adjustment operation will be described. For the purpose of simple description, an adjustment of an overlapped region in adjacent two projector units (temporarily, referred to as $PJU_a$ and $PJU_b$) will be described.

First, as shown in FIG. 9, a weight function in the overlapped region is added to a pixel value of unit image information such that the projection images ($I_{a2}$, $I_{b2}$) from the adjacent projector units $PJU_a$ and $PJU_b$ are connected smoothly to each other. In this situation, as the weight function, as shown in FIG. 10, a weight function taking γ correction into consideration is used. By doing so, as shown in FIG. 11, the projection images from the adjacent projector units $PJU_a$ and $PJU_b$ are connected to each other. As a result, as shown in FIG. 12, the projection images from the adjacent two projector units are satisfactorily synthesized and smoothly connected to each other.

That is, in the rear projection type multi-projection display 300 according to the third exemplary embodiment, when two unit image information are generated based on the original image information relating to the original image (FIG. 12A), the unit images (FIG. 12B) are generated such that they are smoothly connected to each other on the transmissive screen (FIG. 12C). Thus, the projection images from the adjacent two projector units $PJU_a$ and $PJU_b$ are satisfactorily synthesized and smoothly connected to each other.

Fourth Exemplary Embodiment

Figure 19:
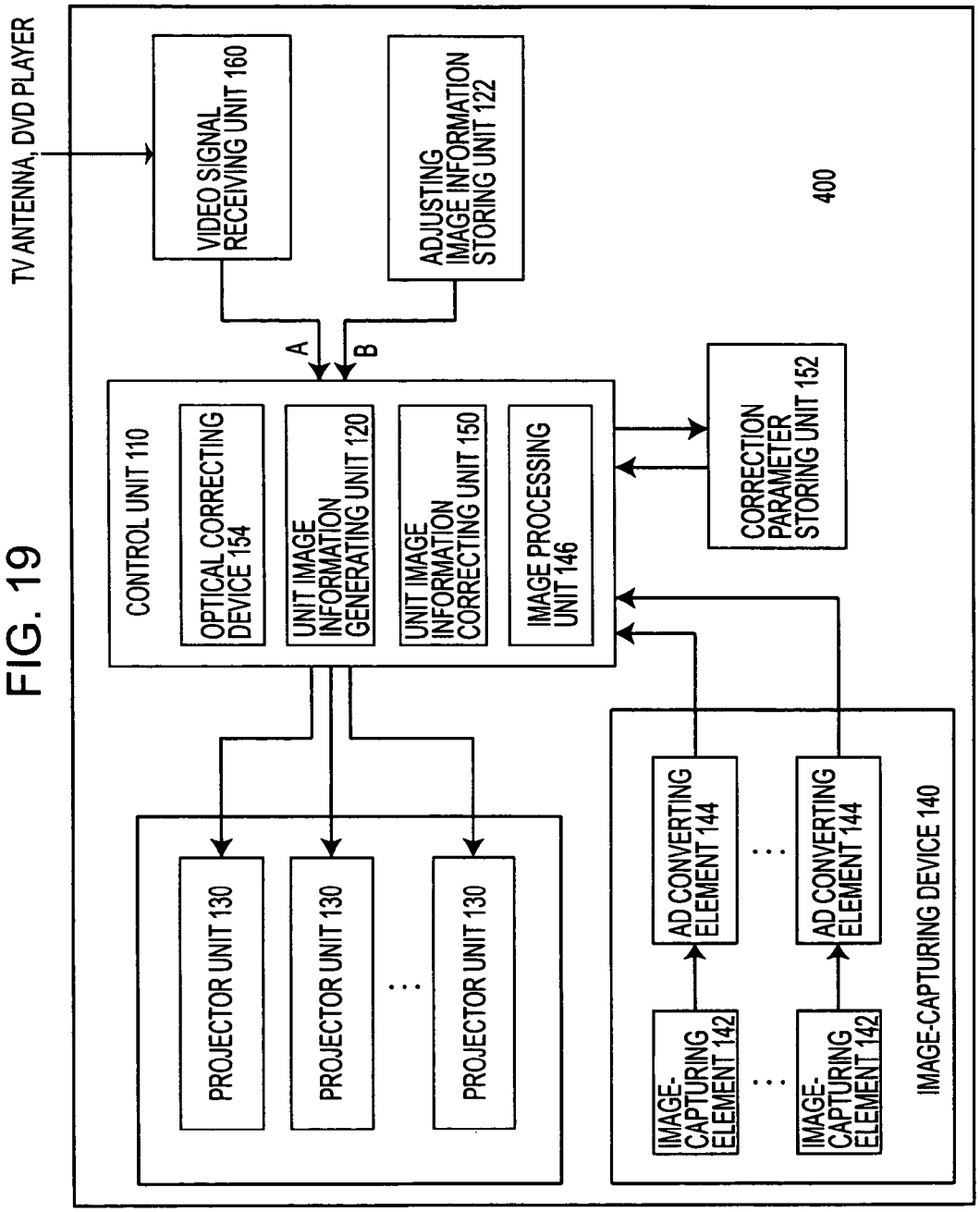
FIG. 19 is a schematic block diagram illustrating an outline of the rear projection type multi-projection display according to the fourth exemplary embodiment.

FIGS. 18A-B are schematic diagrams showing a construction of a rear projection type multi-projection display according to a fourth exemplary embodiment. FIG. 19 is a schematic block diagram illustrating an outline of the rear projection type multi-projection display according to the fourth exemplary embodiment.

As shown in FIGS. 18 and 19, since the image-capturing device 140 has a plurality of image-capturing elements 142, in the rear projection type multi-projection display 400 according to the fourth exemplary embodiment has the following advantages, in addition to the advantages of the rear projection type multi-projection display 100 according to the first exemplary embodiment.

That is, since image-capturing element to be used can be selected by a capturing object, it is possible to reduce the capturing time. Accordingly, the adjustment time is also reduced, the precision of capturing and adjustment can be enhanced.

Fifth Exemplary Embodiment

FIGS. 20A-B are schematic diagrams illustrating a construction of a rear projection type multi-projection display according to a fifth exemplary embodiment. FIG. 21 is a block schematic diagram illustrating an outline of the rear projection type multi-projection display according to the fifth exemplary embodiment.

As shown in FIGS. 20 and 21 a rear projection type multi-projection display 500 according to the fifth exemplary embodiment further includes a light-shielding device 172 having a light-shielding curtain 178. The light-shielding curtain 178 shields external light which is incident on a housing 502 via a transmissive screen 508 when capturing an image by using an image-capturing device 140. Therefore, the rear projection type multi-projection display 500 according to the fifth exemplary embodiment has the following advantages, in addition to the advantages of the rear projection type multi-projection display 100 according to the first exemplary embodiment.

That is, since the light-shielding curtain 178 is put in an accommodating unit 176 at ordinary times, the light-shielding curtain does not shade the transmissive screen 508. But, when the adjustment operation is performed, the light-shielding curtain 178 moves along a rail 174 in a horizontal direction to shade the transmissive screen 508. Accordingly, when the adjustment operation is performed, since the external light does not enter a housing via the transmissive screen 508, it is possible to lower the brightness level of the external light which enters the image-capturing element 142. As a result, the adjusting images can be captured more accurately.

Other than the light-shielding curtain 178, an opening and closing door, an electrochromic glass having a variable transmittance, a liquid crystal shutter may be used as the light-shielding device. Further, as the light-shielding device, a material of the transmissive screen may be an electrochromic material.

The rear projection type multi-projection display 500 according to the fifth exemplary embodiment is constructed such that the external light is automatically shaded when capturing an image by using the image-capturing device 140. Therefore, there is no need to perform the adjustment operation by a user, and thus the adjustment operation does not get complicated.

Sixth Exemplary Embodiment

Figure 22:
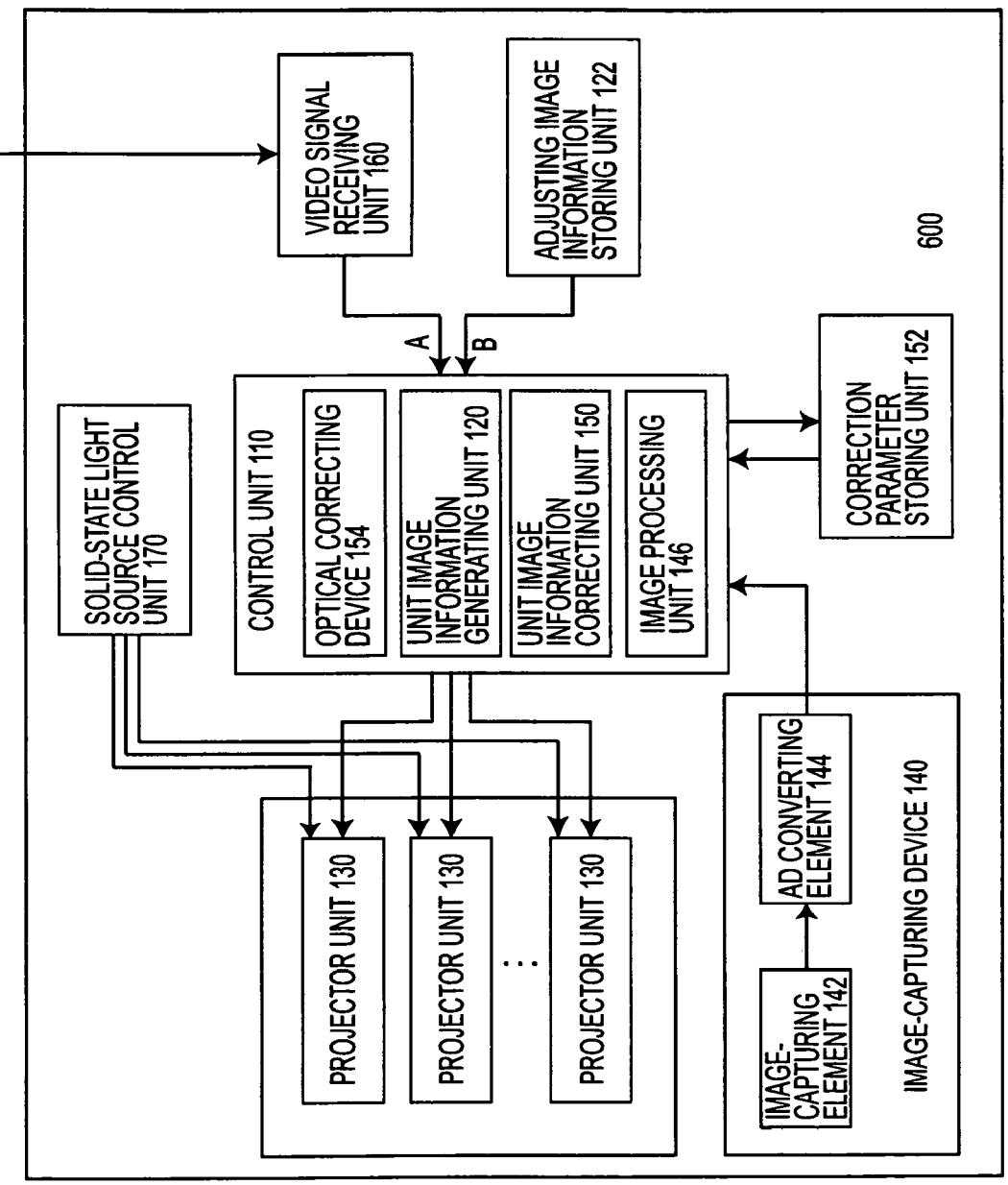
FIG. 22 is a schematic block diagram illustrating an outline of the rear projection type multi-projection display according to a sixth exemplary embodiment.
Figure 23B:
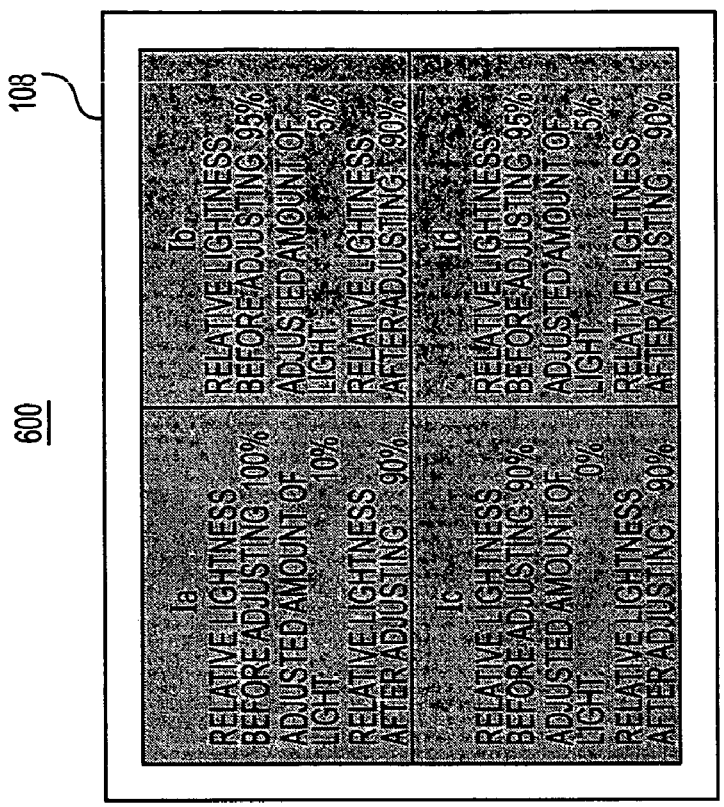
FIGS. 23A-B are schematic diagrams illustrating advantages of the rear projection type multi-projection display according to the sixth exemplary embodiment.
Figure 23A:
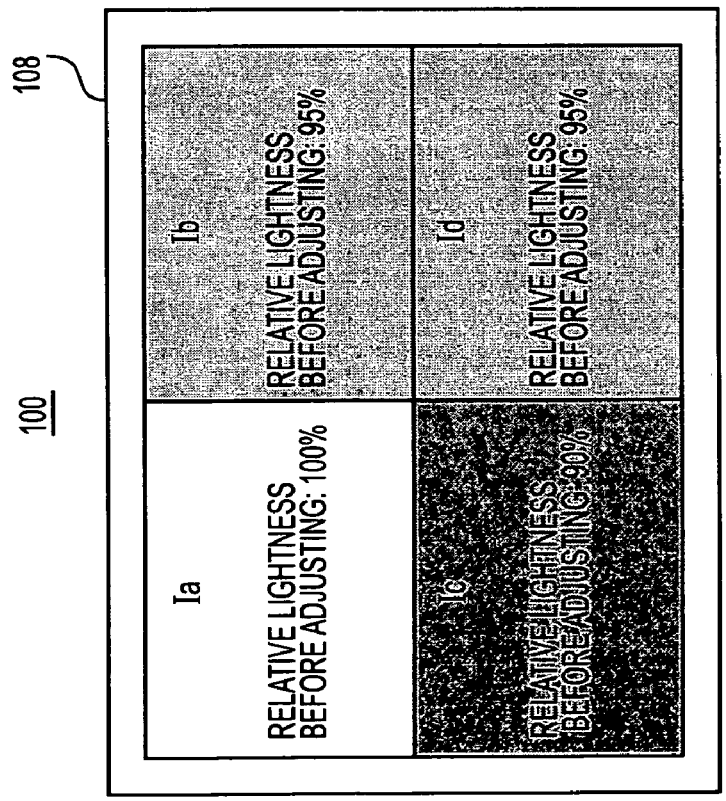
Figure 24B:
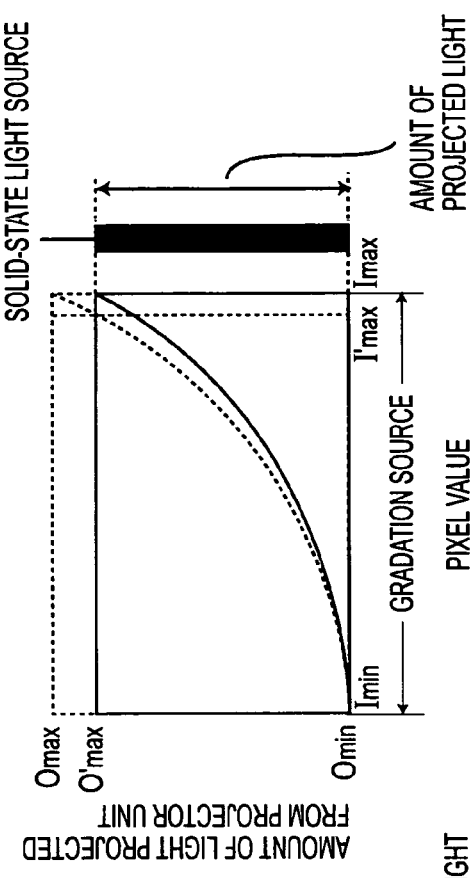
FIGS. 24A-B are schematic diagrams illustrating advantages of the rear projection type multi-projection display according to the sixth exemplary embodiment.
Figure 24A:
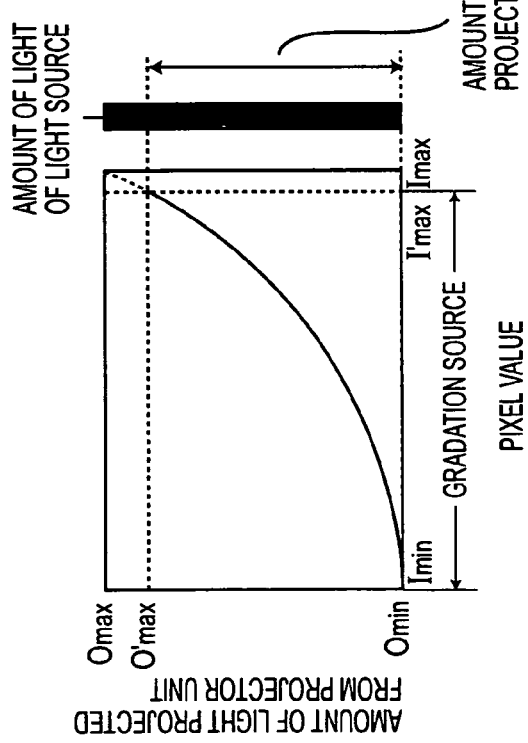

FIG. 22 is a diagram showing an outline of a rear projection type multi-projection display according to a sixth exemplary embodiment. FIGS. 23A-B and 24A-B are schematic diagrams illustrating advantages of the rear projection type multi-projection display according to the sixth exemplary embodiment. FIG. 23A shows a case in which the highest brightness level white display is made in an entire screen of the rear projection type multi-projection display according to the first exemplary embodiment, and FIG. 23B shows a case in which the highest brightness level white display is made in an entire screen of the rear projection type multi-projection display according to the sixth exemplary embodiment. FIG. 24A shows the brightness adjustment by a liquid crystal device in the projector unit having the highest brightness level, FIG. 24B shows the brightness adjustment by a solid-state light source control unit in the projector unit having the highest brightness level.

As shown in FIG. 22, the rear projection type multi-projection display 600 according to the sixth exemplary embodiment further includes the solid-state light source control unit 170 to control the amount of light emitted from the LED light sources for every projector unit 130, in addition to the construction of the rear projection type multi-projection display 100 according to the first exemplary embodiment. The solid-state light source control unit 170 has a function of controlling the amount of light emitted from the LED light sources for every liquid crystal device.

For this reason, the rear projection type multi-projection display 600 according to the sixth exemplary embodiment has the following advantages, in addition to the advantages in the rear projection type multi-projection display 100 according to the first exemplary embodiment.

That is, according to the rear projection type multi-projection display 600 of the sixth exemplary embodiment, as shown in FIG. 23B, it is possible to control separately the amount of light emitted from the LED light sources for every projector unit 130. Thus, it is possible to absorb the difference of the brightness characteristics or the color characteristics for every projector unit 130 by controlling the amount of light emitted from the LED light sources. For this reason, as shown in FIG. 24, there is no need for using the gradation source in the liquid crystal device. Thus, there is no case in which the number of effective gradations inherent in the rear projection type multi-projection display is lowered or the dynamic range becomes narrow.

Further, according to the rear projection type multi-projection display 600 of the sixth exemplary embodiment, it is possible to control separately the amount of light emitted from the LED light sources for every liquid crystal device. Thus, it is also possible to absorb the difference of the color characteristics for every projector unit 130 by controlling the amount of light emitted from the LED light sources.

In the rear projection type multi-projection display 600 according to the sixth exemplary embodiment, as shown in FIG. 23B, in order to absorb the difference of the brightness characteristic for every projector unit 130, in the projector units (projector units projecting the unit images Ia, Ib and Id) other than the projector unit having the lowest brightness level (projector unit projecting the unit image Ic), the amount of light emitted from the LED light sources is lowered such that the brightness level in the projector units complies with the brightness level in the projector unit having the lowest brightness level.

In the rear projection type multi-projection display 600 according to the sixth exemplary embodiment, the amount of light emitted from the LED light sources is controlled for every color light component.

In the rear projection type multi-projection display 600 according to the sixth exemplary embodiment, the solid-state light source control unit 170 may separately control voltages to be supplied to the LED light sources or may separately control the emitting periods of the LED light sources, for every projector unit 130 and/or for every liquid crystal device. In any cases, it is possible to easily decrease or increase brightness of the LED light sources.

Seventh Exemplary Embodiment

FIGS. 25A-B are schematic diagrams illustrating advantages of a rear projection type multi-projection display according to a seventh exemplary embodiment. FIG. 25A shows an amount of light projected from a projector unit that projects totally bright image, and FIG. 25B shows an amount of light projected from a projector unit that projects totally dark image.

The rear projection type multi-projection display 700 (not shown) according to the seventh exemplary embodiment includes the solid-state light source control unit 172 (not shown) to control the amount of light emitted from the LED light sources for every projector unit, similarly to the rear projection type multi-projection display 600 according to the sixth exemplary embodiment. Further, the solid-state light source control unit 172 has a function of controlling the amount of light emitted from the LED light sources for every liquid crystal device, similarly to the rear projection type multi-projection display 600 according to the sixth exemplary embodiment.

In the rear projection type multi-projection display 700 according to the seventh exemplary embodiment, the solid-state light source control unit 172 also has a function of dynamically controlling the amount of light emitted from the LED light sources, in addition to the above-mentioned function.

For this reason, the rear projection type multi-projection display 700 according to the seventh exemplary embodiment has the following advantages, in addition to the advantages in the rear projection type multi-projection display 600 according to the sixth exemplary embodiment.

That is, as shown in FIG. 25B, in the case in which a totally dark image is displayed (for example, a case in which a night scene in a movie is displayed), instead of or in addition to lowering the transmittance of the liquid crystal devices, by decreasing the amount of light emitted from the LED light sources, it is possible to make an entire screen dark. Further, as shown in FIG. 25A, in the case in which a totally bright screen is displayed (for example, a case in which an outdoor scene in the daytime in a movie is displayed), instead of or in addition to increasing the transmittance of the liquid crystal devices, by increasing the amount of light emitted from the LED light sources, it is possible to make the entire screen bright.

For this reason, it is possible to increase the number of effective gradations or the dynamic range, which results in a high image quality multi-projection display having an excellent black level.

Eighth Exemplary Embodiment

FIG. 26 is a schematic diagram illustrating advantages of a rear projection type multi-projection display according to an eighth exemplary embodiment.

The rear projection type multi-projection display 800 (not shown) according to the eighth exemplary embodiment includes the solid-state light source control unit 174 (not shown) to control the amount of light emitted from the LED light sources for every projector unit and for every liquid crystal device, similarly to the rear projection type multi-projection display 700 according to the seventh exemplary embodiment. Further, the solid-state light source control unit 174 also has a function of dynamically controlling the amount of light emitted from the LED light sources, similarly to the rear projection type multi-projection display 700 according to the seventh exemplary embodiment.

In the rear projection type multi-projection display 800 according to the eighth exemplary embodiment, the solid-state light source control unit 174 also has a function of dynamically controlling the amount of light emitted from the LED light sources for every projector unit, in addition to the above-mentioned function.

For this reason, the rear projection type multi-projection display 800 according to the eighth exemplary embodiment has the following advantages, in addition to the advantages in the rear projection type multi-projection display 700 according to the seventh exemplary embodiment.

That is, as shown in FIG. 26, in the case in which an image in which a bright screen and a dark screen exist in one screen is displayed, it is possible for the rear projection type multi-projection display to exhibit the expression ability exceeding the number of effective gradation or the dynamic range inherent in the rear projection type multi-projection display. In addition, it is possible to perform high image quality display.

Ninth Exemplary Embodiment

A rear projection type multi-projection display 900 (not shown) according to the a ninth exemplary embodiment includes the solid-state light source control unit 176 (not shown) to control the amount of light emitted from the LED light sources for every projector unit and for every liquid crystal device, similarly to the rear projection type multi-projection display 800 according to the eighth exemplary embodiment. Further, the solid-state light source control unit 176 also has a function of dynamically controlling the amount of light emitted from the LED light sources for every projector unit.

The rear projection type multi-projection display 900 according to the ninth exemplary embodiment includes a liquid crystal device, which performs writing at least twice to one unit image information, as the liquid crystal device. Further, in the rear projection type multi-projection display 900 according to the ninth exemplary embodiment, the solid-state light source control unit 176 has a function of allowing the solid-state light source to emit during one frame outside, at least the first writing period of the liquid crystal devices.

Figure 27A:
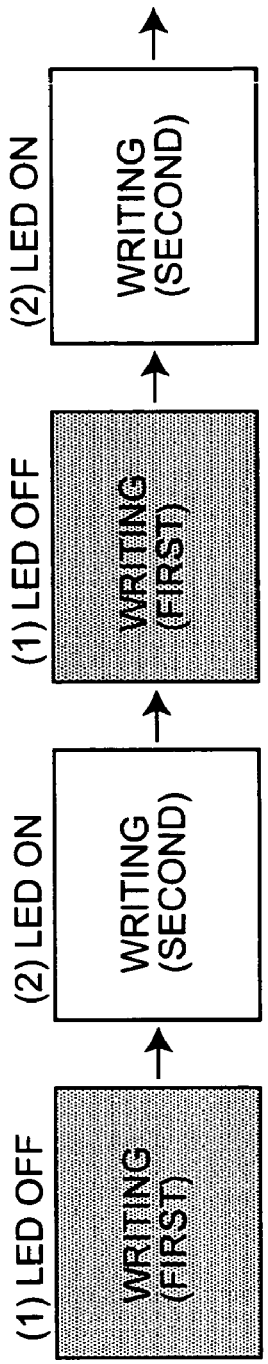
FIGS. 27A-C are schematic diagrams illustrating operations of a rear projection type multi-projection display according to a ninth exemplary embodiment.
Figure 27B:
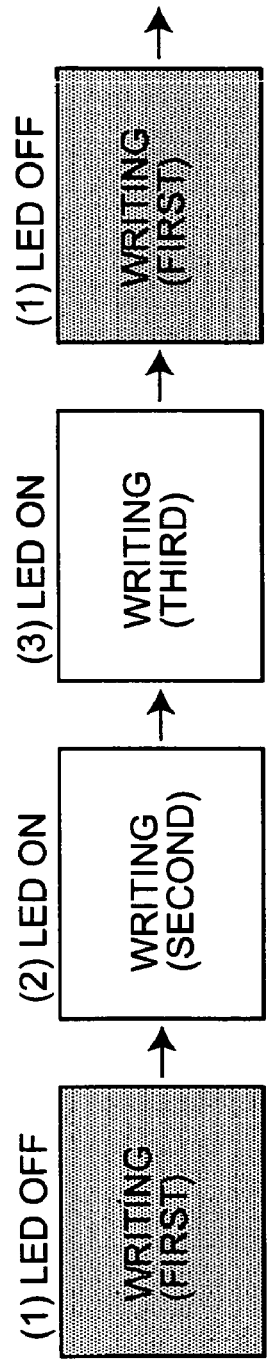
Figure 27C:
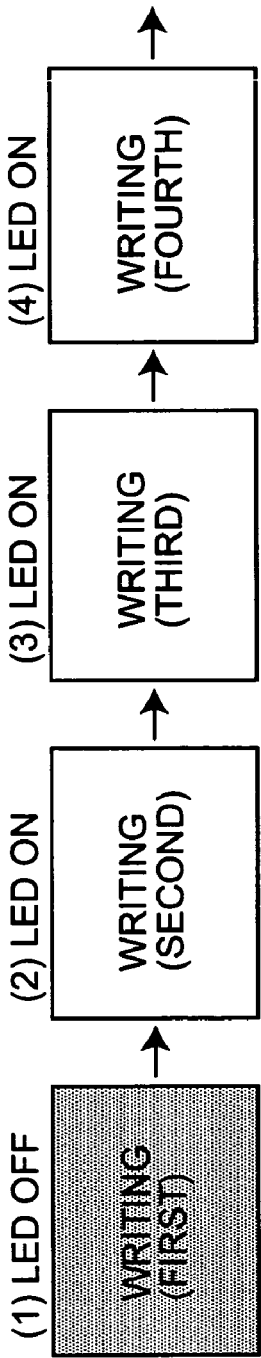

FIGS. 27A-C are schematic diagrams illustrating operations of the rear projection type multi-projection display according to the ninth exemplary embodiment. FIG. 27A shows a two-time speed driving liquid crystal device, FIG. 27B shows a three-time speed driving liquid crystal device, and FIG. 27C shows a four-time speed driving liquid crystal device.

According to the rear projection type multi-projection display 900 of the ninth exemplary embodiment, as shown in FIGS. 27A-C, writing is performed at least twice to one unit screen information, and a liquid crystal device of a so-called n-time speed driving (here, n is a natural number of 2 or more) is used. Further, the solid-state light source is allowed to emit outside, at least the first writing period of the liquid crystal device. Thus, it becomes possible to project intermittently the projection images onto the transmissive screen. For this reason, it is possible to alleviate the tailing phenomenon which is a defect of the hold type display, and further it is possible to perform moving picture display smoothly with satisfactory quality.

Further, in the first writing period, since the liquid crystal molecules do not yet sufficiently respond, it is not easy to raise contrast of the liquid crystal device. However, according to the rear projection type multi-projection display 900 of the ninth exemplary embodiment, since the solid-state light source is allowed to emit outside the first writing period, in the liquid crystal device and the rear projection type multi-projection display, it has an advantage that it is possible to further enhance contrast.

Tenth Exemplary Embodiment

Figure 28A:
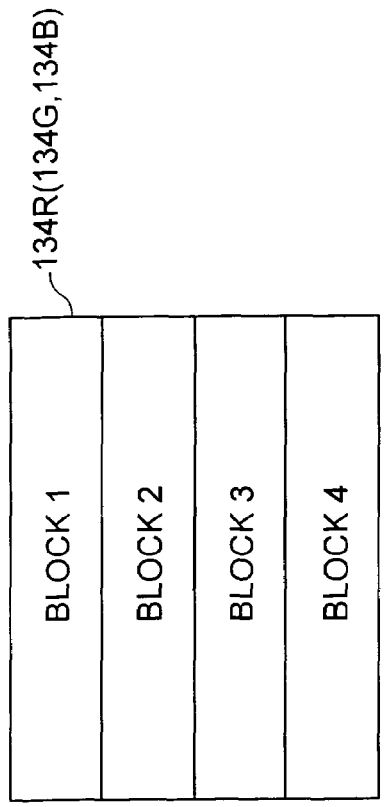
FIGS. 28A-B are schematic diagrams illustrating operations of a rear projection type multi-projection display according to a tenth exemplary embodiment.
Figure 28B:
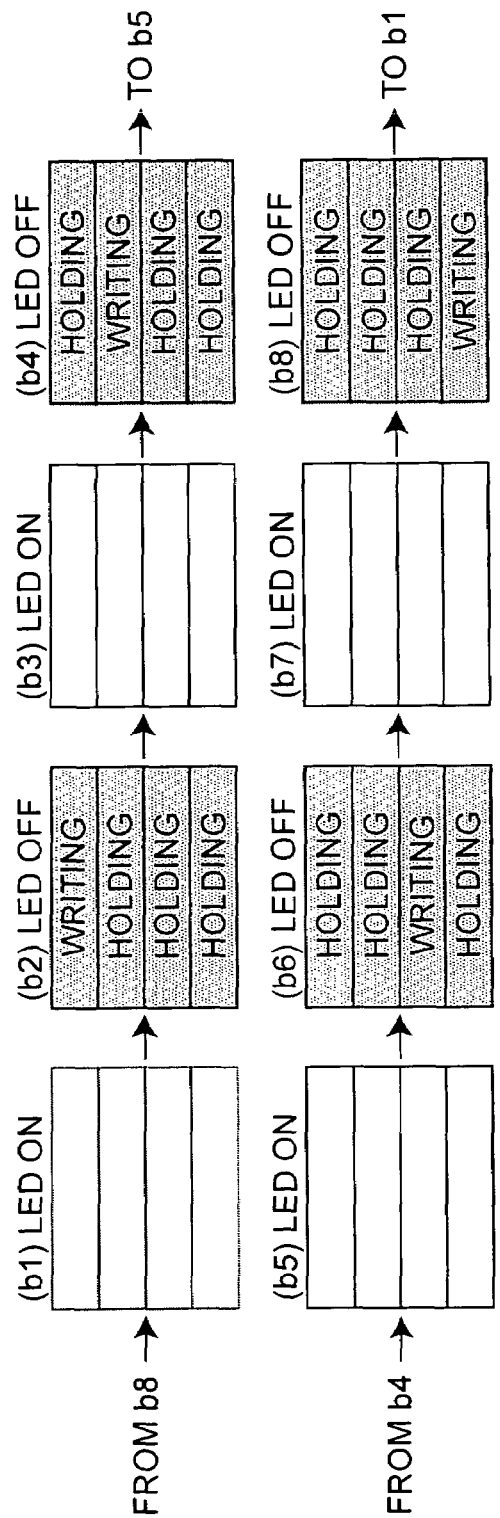

FIGS. 28A-B are schematic diagrams showing operations of a rear projection type multi-projection display according to a tenth exemplary embodiment. The rear projection type multi-projection display 1000 (not shown) according to the tenth exemplary embodiment includes the solid-state light source control unit 178 (not shown) to control the amount of light emitted from the LED light sources for every projector unit or for every liquid crystal device 134R, 134G or 134B, similarly to the rear projection type multi-projection display 800 according to the eighth exemplary embodiment. Further, the solid-state light source control unit 178 has a function of dynamically controlling the amount of light emitted from the LED light sources for every projector unit.

The rear projection type multi-projection display 1000 according to the tenth exemplary embodiment includes the liquid crystal devices 134R, 134G, and 134B, which perform image writing sequentially for every screen region during one frame, as the liquid crystal device. Further, in the rear projection type multi-projection display 1000 according to the tenth exemplary embodiment, the solid-state light source control unit 178 has a function of allowing the LED light sources to emit during one frame outside the image writing periods of the liquid crystal devices 134R, 134G, and 134B.

For this reason, according to the rear projection type multi-projection display 1000 of the tenth exemplary embodiment, the LED light sources are allowed to emit outside the image writing periods of the liquid crystal devices 134R, 134G, and 134B. Thus, it has an advantage that it is possible to further enhance contrast in the rear projection type multi-projection display.

Eleventh Exemplary Embodiment

Figure 29:
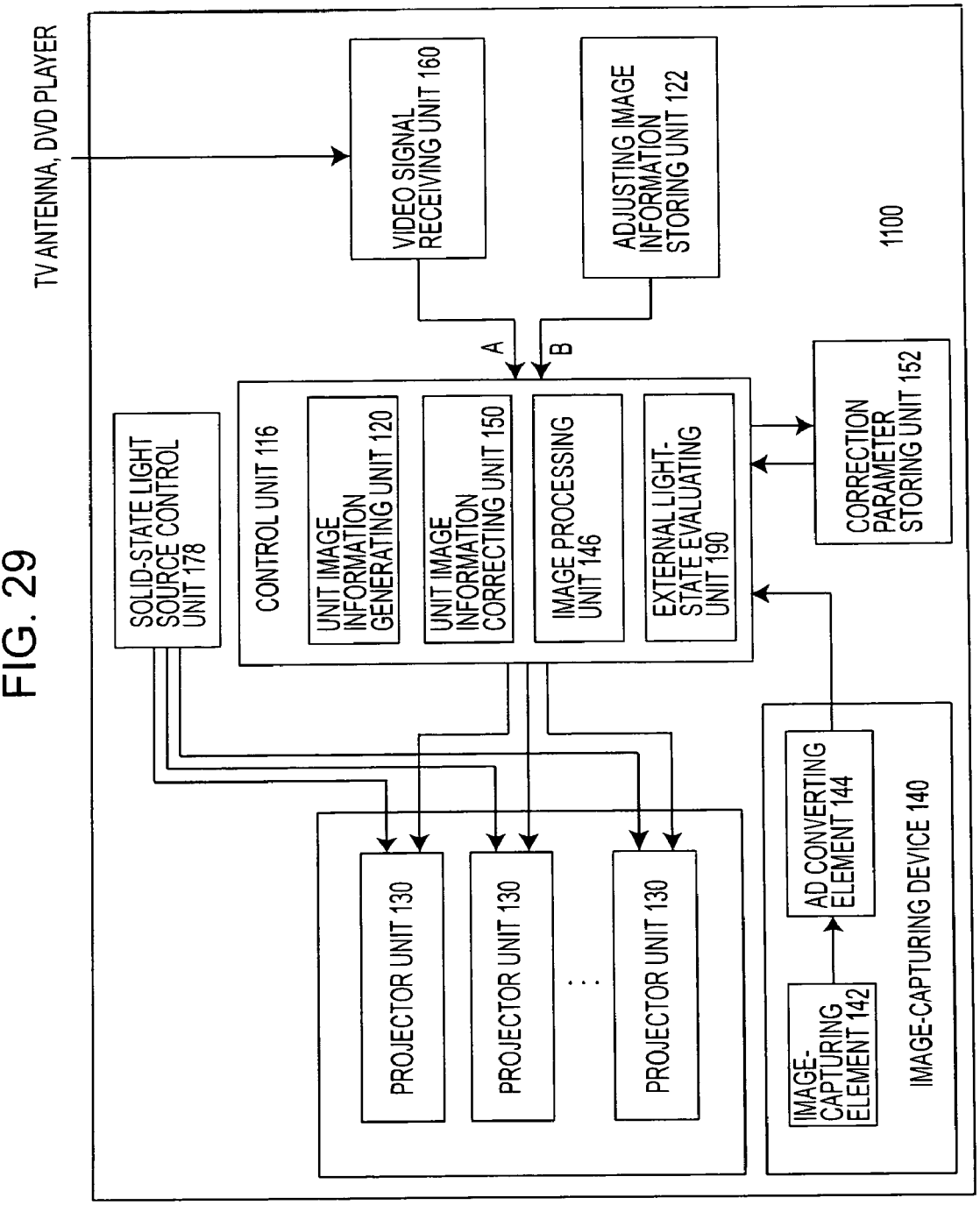
FIG. 29 is a schematic block diagram illustrating an outline of a rear projection type multi-projection display according to an eleventh exemplary embodiment.

FIG. 29 is a schematic block diagram showing an outline of a rear projection type multi-projection display according to an eleventh exemplary embodiment. The rear projection type multi-projection display 1100 according to the eleventh exemplary embodiment further includes an external light state evaluating unit 190 to evaluate a state of external light by capturing a transmissive screen in a state when the LED light source does not emit or weakly emits.

The solid-state light source control unit 178 has a function of controlling the amount of light emitted from the LED light source taking a result evaluated by the external light state evaluating unit 190 into consideration.

Therefore, according to the rear projection type multi-projection display 1100 according to the eleventh exemplary embodiment, in the presence of a strong external light, the amount of light emitted from the LED light source is correspondingly increased to lessen the effect of the external light during the image capturing process.

In the rear projection type multi-projection display 1100 according to the eleventh exemplary embodiment, the external light state evaluating unit 190 has a function of evaluating the state of the external light by capturing the transmissive screen based on an amount of light which is emitted from the light source at at least two emitting levels.

According to the rear projection type multi-projection display 1100 according to the eleventh exemplary embodiment, the effect of the external light on the image quality is non-linear. Therefore, the state of the external light is evaluated by capturing the transmissive screen based on an amount of light which is emitted from the light source at at least two emitting levels to lessen the effect of the external light during the image capturing process.

Twelfth Exemplary Embodiment

Figure 30:
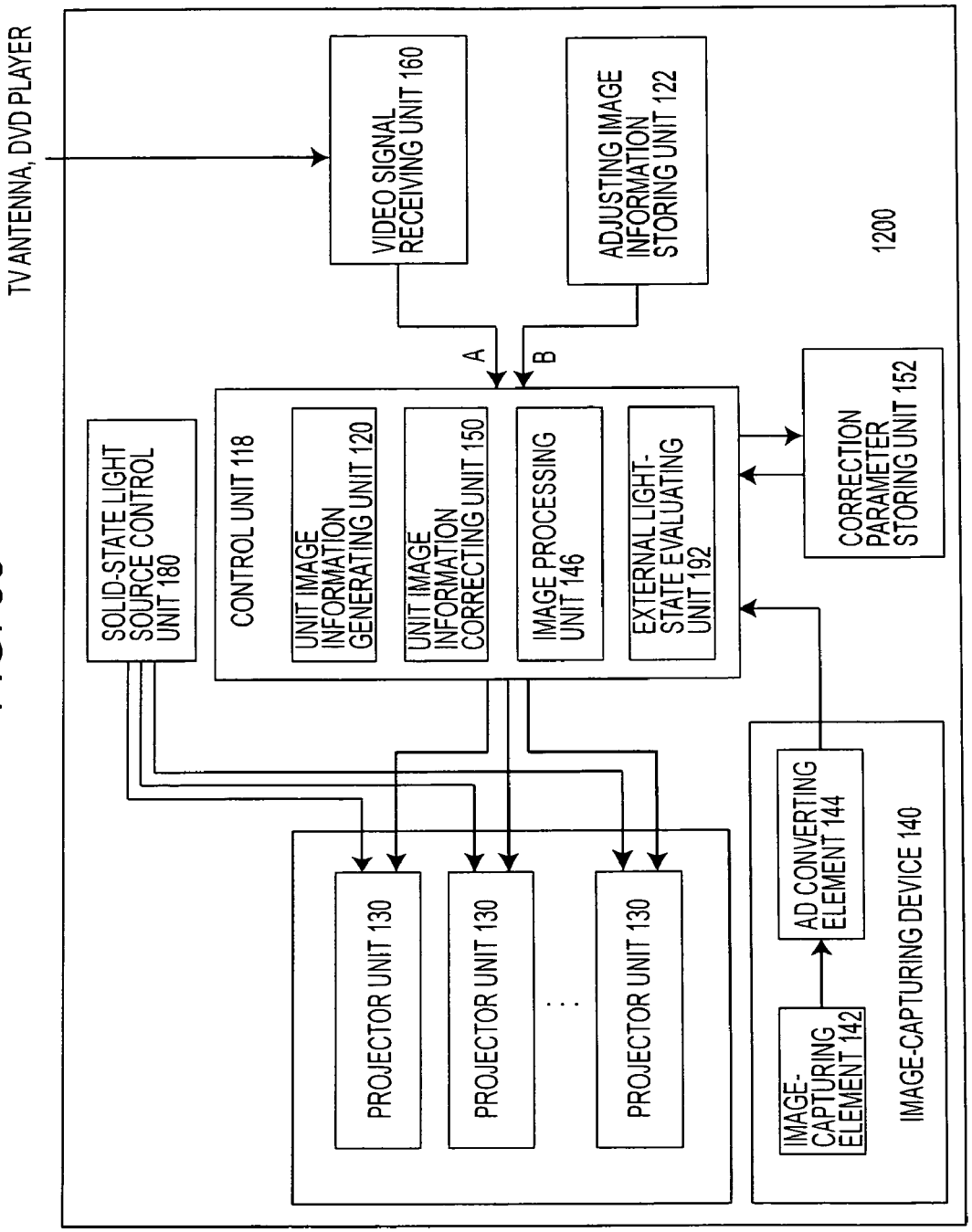
FIG. 30 is a schematic block diagram illustrating an outline of a rear projection type multi-projection display according to a twelfth exemplary embodiment.

FIG. 30 is a schematic block diagram showing an outline of a rear projection type multi-projection display according to a twelfth exemplary embodiment. In the rear projection type multi-projection display 1200 according to the twelfth exemplary embodiment, the external light state evaluating unit 192 has a function of evaluating stray light state by capturing the transmissive screen in a state when the LED light source in at least one projector unit 130 of the plurality of projector units 130, does not emit or weakly emits.

Therefore, the amount of light emitted from the LED light source is controlled based on a result that the state of stray light is evaluated by the external light state evaluating unit 192.

As a result, according to the rear projection type multi-projection display 1200 of the twelfth exemplary embodiment, it is possible to control the amount of light emitted from the LED light source in response to the state of stray light to lessen the effect of the external light or stray light during the image-capturing process. Moreover, it is possible to enhance the color reproducibility in the rear projection type multi-projection display.

What is claimed is:

1. A rear projection type multi-projection display, comprising:
   a housing;
   a plurality of projector units, disposed in the housing, to modulate and project light from a light source based on image information;
   a transmissive screen to which projection images from the plurality of projector units are projected;
   an image-capturing device, disposed in the housing, to capture predetermined regions of the projection images projected onto the transmissive screen;
   a unit image information generating unit to generate image information to be inputted to each of the plurality of projector units;
   a unit image information correcting unit to correct the unit image information based on a result captured by the image-capturing device; and
   an external light state evaluating unit evaluating a state of external light by capturing the transmissive screen based on the amount of light which is emitted from the light source at least at two emitting levels.

2. The rear projection type multi-projection display according to claim 1, further comprising:
   a light-shielding device to shield external light incident on the housing via the transmissive screen when capturing an image by using the image-capturing device.

3. The rear projection type multi-projection display according to claim 1, further comprising:
   the external light state evaluating unit evaluating the state of the external light by capturing the transmissive screen in a state when the light source at least one of does not emit and weakly emits,
   the amount of light emitted from the light source being controlled based on an evaluation result by the external light state evaluating unit.

4. The rear projection type multi-projection display according to claim 3,
   the external light state evaluating unit evaluating a state of stray light by capturing the transmissive screen in a state when the light source in at least one of the plurality of projector units does not emit or weakly emits.

5. The rear projection type multi-projection display according to claim 1,
   the image-capturing device changing a capturing range.

6. The rear projection type multi-projection display according to claim 1,
   the image-capturing device having a plurality of image-capturing elements.

7. The rear projection type multi-projection display according to claim 1,
   the image-capturing device capturing the entire transmissive screen.

8. The rear projection type multi-projection display according to claim 1,
   the unit image information correcting unit correcting the shapes, positions and/or inclinations of unit images projected by the projector units.

9. The rear projection type multi-projection display according to claim 1,
   the unit image information correcting unit correcting at least one of the brightness and colors of the unit images projected by the projector units.

10. The rear projection type multi projection display according to claim 1,
    the unit image information correcting unit correcting at least one of the brightness and color for every pixel in the plurality of projector units.

11. The rear projection type multi-projection display according to claim 1,
    the unit image information correcting unit correcting the unit image information using correction parameters that are determined based on the captured result.

12. The rear projection type multi-projection display according to claim 11, further comprising:
    a correction parameter storing unit to store the correction parameters.

13. The rear projection type multi-projection display according to claim 11, further comprising:
    an automatic correction parameter acquiring device to automatically acquire the correction parameters by capturing an adjusting image at predetermined intervals.

14. The rear projection type multi-projection display according to claim 1, further comprising:
    an optical correcting device to correct at least one of the position and orientation of an optical element provided in the rear projection type multi-projection display.

15. The rear projection type multi-projection display according to claim 14, further comprising:
    an automatic optical element correcting device to automatically correct at least one of the position and orientation of the optical element by capturing the adjusting image at predetermined intervals.

16. The rear projection type multi-projection display according to claim 3,
    the external light state evaluating unit automatically evaluating the state of the external light by capturing the transmissive screen at predetermined intervals.

17. The rear projection type multi-projection display according to claim 1,
    the light source being a solid-state light source.

18. The rear projection type multi-projection display according to claim 17, further comprising:
    a solid-state light source control unit to control the amount of light emitted from the solid-state light source separately for every projector unit.

19. A rear projection type multi-projection display, comprising:
    a housing;
    a plurality of projector units, disposed in the housing, to modulate and project light from a light source based on image information;
    a transmissive screen to which projection images from the plurality of projector units are projected;
    an image-capturing device, disposed in the housing, to capture predetermined regions of the projection images projected onto the transmissive screen;
    a unit image information generating unit to generate image information to be inputted to each of the plurality of projector units;
    a unit image information correcting unit to correct the unit image information based on a result captured by the image-capturing device;
    an optical correcting device to correct at least one of the position and orientation of an optical element provided in the rear projection type multi-projection display; and
    an automatic optical element correcting device to automatically correct at least one of the position and orientation of the optical element by capturing the adjusting image at predetermined intervals.

20. A rear projection type multi-projection display, comprising:

a housing;

a plurality of projector units, disposed in the housing, to modulate and project light from a light source based on image information;

a transmissive screen to which projection images from the plurality of projector units are projected;

an image-capturing device, disposed in the housing, to capture predetermined regions of the projection images projected onto the transmissive screen;

a unit image information generating unit to generate image information to be inputted to each of the plurality of projector units;

a unit image information correcting unit to correct the unit image information based on a result captured by the image-capturing device;

a light-shielding device to shield external light incident on the housing via the transmissive screen when capturing an image by using the image-capturing device; and the external light state evaluating unit automatically evaluating the state of the external light by capturing the transmissive screen at predetermined intervals.

* * * * *